US011605076B2

(12) United States Patent
Dunjic et al.

(10) Patent No.: US 11,605,076 B2
(45) Date of Patent: Mar. 14, 2023

(54) RECONCILIATION OF INDIRECTLY EXECUTED EXCHANGES OF DATA USING PERMISSIONED DISTRIBUTED LEDGERS

(71) Applicant: The Toronto-Dominion Bank, Toronto (CA)

(72) Inventors: Milos Dunjic, Oakville (CA); Arthur Carroll Chow, Markham (CA); David Samuel Tax, Toronto (CA); Armon Rouhani, Toronto (CA); Asad Joheb, Toronto (CA); Sara Hatherly, Alliston (CA); Keith Sanjay Ajmani, Toronto (CA); Lionel Johnson, Mississauga (CA); Yubing Liu, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 182 days.

(21) Appl. No.: 16/371,594

(22) Filed: Apr. 1, 2019

(65) Prior Publication Data

US 2020/0311724 A1    Oct. 1, 2020

(51) Int. Cl.
*G06Q 20/38* (2012.01)
*G06F 16/23* (2019.01)
(Continued)

(52) U.S. Cl.
CPC ....... *G06Q 20/389* (2013.01); *G06F 16/2379* (2019.01); *G06F 16/258* (2019.01);
(Continued)

(58) Field of Classification Search
None
See application file for complete search history.

(56) References Cited

U.S. PATENT DOCUMENTS 9,722,790 B2    8/2017 Ebrahimi
9,794,074 B2    10/2017 Toll
(Continued)

FOREIGN PATENT DOCUMENTS

CN     107392769 A    11/2017
CN     107545419 A    5/2018
(Continued)

OTHER PUBLICATIONS

Zhang, Yuxi. "Scaling Blockchain Applications with Pub/Sub", ProQuest Dissertations Publishing. (2019) (Year: 2019).*
(Continued)

*Primary Examiner* — Neha Patel
*Assistant Examiner* — Clay C Lee
(74) *Attorney, Agent, or Firm* — Duane Morris LLP

(57) ABSTRACT

The disclosed exemplary embodiments include computer-implemented systems, apparatuses, and processes that monitor and reconcile indirectly initiated exchanges of data between network-connected devices and computing systems using a permissioned distributed ledger. For example, an apparatus may obtain and transmit first transaction information characterizing a data exchange to a first computing system. The first computing system may submit a portion of the first transaction information to a second computing system through a programmatic interface inaccessible to the apparatus, and the second computing system may execute the data exchange in accordance with at least the portion of the first transaction information. The apparatus may also obtain at least one element of a distributed ledger that includes encrypted second transaction information characterizing the execution of the data exchange, decrypt the encrypted second transaction data and perform operations that reconcile the first transaction information and the decrypted second transaction information.

20 Claims, 12 Drawing Sheets

(51) Int. Cl.
    *G06F 16/25*     (2019.01)
    *G06F 21/60*     (2013.01)
    *H04L 9/08*     (2006.01)
    *H04L 9/30*     (2006.01)

(52) U.S. Cl.
    CPC ....... *G06F 21/602* (2013.01); *G06Q 20/3829* (2013.01); *H04L 9/0819* (2013.01); *H04L 9/30* (2013.01); *G06Q 2220/00* (2013.01)

(56) References Cited

U.S. PATENT DOCUMENTS

| | | | |
|---|---|---|---|
| 10,108,794 B2 * | 10/2018 | Bouse | H04L 63/102 |
| 10,135,802 B2 * | 11/2018 | Miu | G06Q 20/4014 |
| 10,657,566 B2 * | 5/2020 | Manning | G06Q 30/08 |
| 2002/0077178 A1 * | 6/2002 | Oberberger | G07F 17/32 463/42 |
| 2013/0211929 A1 * | 8/2013 | Itwaru | G06Q 20/325 705/16 |
| 2016/0292672 A1 | 6/2016 | Fay | |
| 2016/0300234 A1 | 10/2016 | Moss-Pultz | |
| 2016/0342989 A1 | 11/2016 | Davis | |
| 2017/0237554 A1 | 8/2017 | Jacobs | |
| 2017/0264428 A1 | 9/2017 | Seger, II | |
| 2017/0228371 A1 | 10/2017 | Seger, II | |
| 2017/0330179 A1 | 11/2017 | Song | |
| 2017/0330180 A1 | 11/2017 | Song | |
| 2017/0366516 A1 | 12/2017 | Pattanaik | |
| 2018/0060836 A1 | 1/2018 | Castagna | |
| 2018/0308134 A1 * | 10/2018 | Manning | G06Q 30/0275 |
| 2019/0166110 A1 * | 5/2019 | Miu | G06Q 20/4014 |
| 2020/0089670 A1 * | 3/2020 | Padmanabhan | G06F 16/2379 |
| 2020/0167453 A1 * | 5/2020 | Bouse | G06F 21/31 |
| 2020/0167769 A1 * | 5/2020 | Green | G06Q 20/3825 |
| 2020/0177581 A1 * | 6/2020 | Vijayaraghavan | H04L 63/0861 |
| 2020/0220711 A1 * | 7/2020 | Walters | H04L 9/3239 |
| 2020/0265479 A1 * | 8/2020 | Manning | G06Q 30/02 |
| 2020/0272767 A1 * | 8/2020 | Dunjic | G06F 16/1834 |

FOREIGN PATENT DOCUMENTS

| | | | | |
|---|---|---|---|---|
| CN | 103229926 A | 6/2018 | | |
| CN | 107122838 A | 1/2019 | | |
| WO | WO-2017000061 A1 * | 1/2017 | | G06Q 20/02 |
| WO | 2017027900 A1 | 2/2017 | | |
| WO | WO-2018226868 A1 * | 12/2018 | | G06F 16/27 |

OTHER PUBLICATIONS

PYMNTS, "Supply Chain, Linked and Billed Via Blockchain," Mar. 16, 2018 (12 pages).

Terlato, "Walmart wants to Patent Blockchain Technology for Secure Payments," Apr. 20, 2018 (4 pages).

* cited by examiner

RECONCILIATION OF INDIRECTLY EXECUTED EXCHANGES OF DATA USING PERMISSIONED DISTRIBUTED LEDGERS

TECHNICAL FIELD

The disclosed embodiments generally relate to computer-implemented systems and processes that reconcile indirectly executed exchanges of data using permissioned distributed ledgers.

BACKGROUND

Today, payment systems and related technologies continuously evolve in response to advances in payment instruments, such as the ongoing transition from physical transaction cards to digital payment instruments maintained on mobile devices. These innovations result in additional mechanisms for submitting payment to an electronic or physical merchant and for flexibly funding transactions initiated by the electronic or physical merchant. These innovations also result in a growing variety of financial institutions and similar entities that process payment transactions on behalf of both customers and merchants, and access existing payment rails and transaction processing networks indirectly through one or more direct participants.

SUMMARY

In some examples, an apparatus includes a communications interface, a memory storing instructions, and at least one processor coupled to the communications interface and the memory. The at least one processor is configured to execute the instructions to obtain first transaction information characterizing a data exchange and to transmit, via the communications interface, the first transaction information to a first computing system. The first computing system is configured to submit a portion of the first transaction information to a second computing system through a programmatic interface, the second computing system is configured to execute the data exchange in accordance with at least the portion of the first transaction information, and the programmatic interface is inaccessible to the apparatus. The at least one processor is further configured to execute the instructions to load at least one element of a distributed ledger from the memory. The at least one element includes encrypted second transaction information that characterizes the execution of the data exchange by the second computing system. The at least one processor is further configured to execute the instructions to decrypt the encrypted second transaction data and perform operations that reconcile the first transaction information and the decrypted second transaction information.

In other examples, a computer-implemented method includes obtaining, by at least one processor, first transaction information characterizing a data exchange and transmitting, by the at least one processor, the first transaction information to a first computing system. The first computing system is configured to submit a portion of the first transaction information to a second computing system through a programmatic interface, the second computing system is configured to execute the data exchange in accordance with at least the portion of the first transaction information, and the programmatic interface is inaccessible to the at least one processor. The computer-implemented method also includes obtaining, by the at least one processor, at least one element of a distributed ledger. The at least one element includes encrypted second transaction information that characterizes the execution of the data exchange by the second computing system. The computer-implemented method further includes, by the at least one processor, decrypting the encrypted second transaction data and performing operations that reconcile the first transaction information and the decrypted second transaction information.

Further, in some examples, an apparatus includes a communications interface, a memory storing instructions, and at least one processor coupled to the communications interface and the memory. The at least one processor is configured to execute the instructions to receive, via the communications interface, first transaction information characterizing a data exchange from a first computing system. The data exchange is initiated by a device in communication with the first computing system, and the at least one processor is further configured to transmit, via the communications interface, a portion of the first transaction information to a second computing system through a programmatic interface. The programmatic interface is inaccessible to the first computing system, and the second computing system is configured to execute the data exchange in accordance with at least the portion of the first transaction information. The at least one processor is further configured to generate second transaction information that characterizes the execution of the data exchange by the second computing system, encrypt the second transaction information using a public cryptographic key of the first computing system, and transmit, via the communications interface, a recordation request that includes the encrypted second transaction information to a peer computing system. The recordation request causes the peer computing system to perform operations that record the encrypted second transaction information within an element of a distributed ledger, the distributed ledger being accessible at the first computing system.

The details of one or more exemplary embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
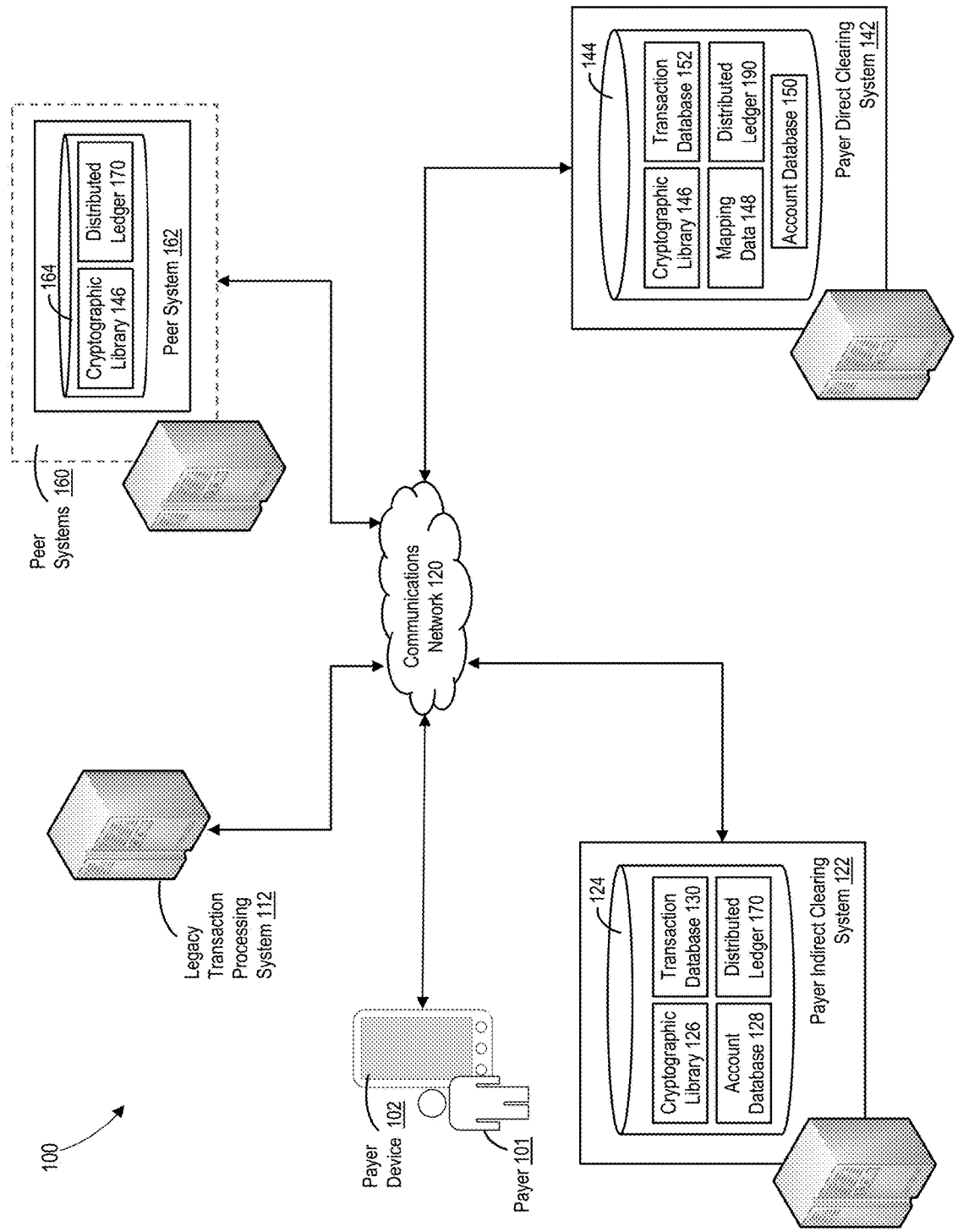
FIG. 1 is a diagram of an exemplary computing environment, consistent with disclosed embodiments.

This specification relates to computer-implemented processes that, among other things, monitor and reconcile a status of indirectly initiated exchanges of data between network-connected devices and computing systems using a permissioned distributed ledger. In some instances, one or more of the computing systems may be associated with, maintained by, or operated by a financial institution that provides financial services to customers. As described herein, these provisioned financial services can include, but are not limited, a clearing and settlement of payment transactions based on elements of payment data submitted directly, or indirectly, to one or more transaction processing networks.

In some examples, a financial institution may represent a direct participant in the one or more transaction processing networks, and as a direct participant, the financial institution may provide transaction settlement and clearance services not only to customers involved in initiated payment transactions, but also to additional financial institutions that provide transaction settlement and clearance services to corresponding customers. As these additional financial institutions access the one or more transaction processing networks through a corresponding direct participant, each of these additional financial institutions may represent an indirect participant in the one or more transaction processing networks.

Further, as a direct participant in the one or more transaction processing networks, the financial institution may also be associated with, operate, or maintain one or more computing systems (e.g., a "direct clearing" system) configured to communicate directly across one or more communications networks with computing systems operated by the one or more transaction processing networks (e.g., one or more "transaction processing" systems). In some examples, the direct clearing system may receive payment instructions, which identify and characterize the payment transactions, from a computing system operated by, or associated with, the indirect participant in the one or more transaction networks (e.g., an "indirect clearing" system). Upon receipt the payment instructions from the indirect clearing system, the direct clearing system may store the payment instructions in a locally accessible data repository and/or in a secure, cloud-based data repository, may format the received portion of the payment instructions for consistency with a data-interchange format associated with the one or more transaction processing networks, and further, may submit the formatted payment instructions to the one or more transaction processing systems.

The one or more transaction processing systems may perform operations that settle and clear each of these additional payment transactions in accordance with the payment instructions, and may generate and transmit data confirming a status of the settlement and clearance of each of the payment transactions to the direct clearing system. In some examples, the direct clearing system may perform operations that reconcile the additional confirmation data against locally stored portion of the payment instructions and additionally, or alternatively, on portions of stored account data associated with the indirect participant (e.g., a settlement account, etc.), and generate elements of reconciliation data indicative of an outcome of the reconciliation process for each of the payment transactions, which the direct clearing system may store within the locally accessible data repository or the secure, cloud-based data repository. The direct clearing system may route the additional confirmation data, and in some instances, the additional elements of reconciliation data, to the indirect clearing system.

The indirect clearing system may perform processes that locally reconcile the additional confirmation data against the locally stored payment instructions and additionally, or alternatively, on portions of stored account data associated with each of the customers, and generate corresponding elements of local reconciliation data indicative of an outcome of the local reconciliation processes, which the indirect clearing system may store within the locally accessible data repository or the secure, cloud-based data repository.

The indirect clearing system may also provide portions of the confirmation data, which characterize a status of the clearance and settlement of corresponding ones of the payment transactions, to each of the network-connected devices or systems associated with, or operated by, the customers, e.g., for presentation within a digital interface.

Due to limitations in bandwidth or capacity in many existing transaction processing networks, and due to the multiple reconciliation processes perform by the direct and indirect clearing systems, certain conventional clearance and settlement processes may increase a pendency of an initiated payment transaction and increase a time required for the indirect clearing system to reconcile payment transactions cleared and settled indirectly and on behalf of the indirect participant by the direct clearing system. Further, as the indirect clearing system may be incapable of accessing directly the one or more transaction processing systems, certain of these conventional processes may limit a capability of the indirect clearing system to access settlement reports generated by the transaction processing system and as such, may obfuscate a status of a settled payment transaction prior to a completion of a reconciliation process by the direct clearing system.

In some exemplary embodiments, as described herein, the indirect and direct clearing systems may, in conjunction with other peer computing systems, establish and participate in a permissioned, distributed-ledger network, and may perform consensus-based operations that establish and maintain a cryptographically secure and permissioned distributed ledger that immutable records, within one or more ledger blocks, encrypted payment summary, settlement status, and/or reconciliation status data characterizing one or more initiated payment transactions at discrete stages of the clearance and settlement process. As described herein, the encrypted payment summary, settlement status, and/or reconciliation status data may also be recorded onto the ledger blocks of the distributed ledger in conjunction with additional information that enables the indirect and direct clearing systems to identify accessible portions of the encrypted payment summary or payment reconciliation data (via a corresponding public cryptographic key) within the ledger blocks and to establish an integrity and authenticity of the encrypted payment summary, settlement status, and/or reconciliation status data.

Certain of these exemplary embodiments, which record participant-specific portions of encrypted payment summary, settlement status, and/or reconciliation status data onto a distributed ledger, may enable participants in a permissioned distributed ledger-network, such as the indirect and direct clearing systems described herein, to track a status of an initiated payment transaction in real-time throughout the clearance and settlement process. These exemplary processes can be implemented in addition to, or as an alternate to, the conventional clearance and settlement processes described herein, and can increase not only a visibility of these clearance and settlement processes to each of the participants in the permissioned distributed-ledger network, and but also an accuracy, speed, and security of the reconciliation processes described herein. Further, certain of these exemplary processes can establish a cryptographically secure, immutable, and tamper-evident audit trail that reduces a potential for fraudulent or malicious activity, either by the participants in the permissioned distributed-ledger network or by other computing systems operated by unauthorized third parties.

FIG. 1 illustrates components of an exemplary computing environment 100, in accordance with some exemplary embodiments. As illustrated in FIG. 1, environment 100 may include one or more computing devices, such as a payer device 102 associated with a payer 103. Environment 100 may also include one or more computing systems associated with a transaction processing network, such as transaction processing system 112, one or more computing systems associated with indirect or direct participants in that transaction processing network, such as a payer indirect clearing system 122 and payer direct clearing system 142, and one or more peer systems 160, such as peer system 162. Further, although not illustrated in FIG. 1, environment 100 may also include one or more additional, or alternate, computing devices or systems, such as, but not limited to, a computing device operated by one or more payees, a computing system operated by a direct or indirect clearer associated with the one or more payees, and a computing system associated with, or operated by, a corresponding regulatory or governmental entity.

As illustrated in FIG. 1, each of payer device 102, transaction processing system 112, payer indirect clearing system 122, payer direct clearing system 142, and peer systems 160, including peer system 162, may be interconnected through any combination of communications networks, such as network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Payer device 102 may, in some instances, correspond a computing device that includes one or more tangible, non-transitory memories storing data and software instructions, and one or more processors coupled to the one or more tangible, non-transitory memories and configured to execute the stored software instructions. As described herein, payer device 102 may be associated with or operated by a corresponding user, such as payer 103, and examples of payer device 102 include, but are not limited to, as a smart phone, tablet computer, a desktop computer, a gaming console, a wearable device, or another computing device, system, or apparatus associated with a payer 103.

In some instances, each of transaction processing system 112, payer indirect clearing system 122, payer direct clearing system 142, and peer systems 160 (including peer system 162) may represent a computing system that includes one or more servers and tangible, non-transitory memory devices storing executable code and application modules. The servers may each include one or more processors or processor-based computing devices, which may be configured to execute portions of the stored code or application modules to perform operations consistent with the disclosed embodiments. Further, in some examples, each of transaction processing system 112, payer indirect clearing system 122, payer direct clearing system 142, and peer systems 160 (including peer system 162) may each include a communications interface coupled to the one or more processors for accommodating wired or wireless communication across network 120 with any of the additional network-connected systems or devices described herein, e.g., a transceiver device.

In other instances, one or more of transaction processing system 112, payer indirect clearing system 122, payer direct clearing system 142, and peer systems 160 (including peer system 162) may correspond to a distributed system that includes computing components distributed across one or more networks, such as network 120, or other networks, such as those provided or maintained by cloud-service providers. Further, one or more of transaction processing system 112, payer indirect clearing system 122, payer direct clearing system 142, and peer systems 160 (including peer system 162) can be incorporated into a single computing system, as described herein.

Payer indirect clearing system 122 and payer direct clearing system 142 may perform operations that, among other things, initiate, execute, monitor, or reconcile exchanges of data based on information generated by payer device 102, e.g., based on an interaction within one or more additional computing systems operating within environment 100, such as, but not limited to, transaction processing system 112. For instance, and as described herein, the exchanges of data may correspond to, or may facilitate, one or more payment transactions that electronically transfer funds from a source account held by payer 103 at a payer financial institution to one or more destination accounts held by corresponding payees and other counterparties, e.g., in satisfaction of an existing or ongoing obligation. Examples of these payment transactions can include, but are electronic funds transfer (EFT) transactions between counterparties, automated funds transfer (AFT) credit transactions between counterparties (e.g., that facilitate payroll processing) and/or AFT debit transactions between counterparties (e.g., that facilitate bill payment transactions, such as mortgage payments, etc.).

In some instances, the payer financial institution may represent an indirect participant in one or more transaction processing networks, such as one or more payment rails that settle one or more of the exemplary payment transactions described herein. Although one or more computing systems associated with, operated by, or maintained by the payer financial institution (e.g., payer indirect clearing system 122 of FIG. 1) may receive payment instructions characterizing one or more payment transactions directly from payer device 102, payer indirect clearing system 122 may be incapable of directly accessing a computing system associated with the one or more transaction processing networks (e.g., transaction processing system 112) or a programmatic interface maintained by transaction processing system 122, and as such, payment indirect clearing system 122 may be incapable of directly submitting direct payment instructions for settlement.

Instead, and as described herein, payer indirect clearing system 122 may be configured to route received payment instructions across network 120 to one or more computing systems associated with, or operated by, a direct participant in the one or more transaction processing networks, such as, but not limited to, payer direct clearing system 142. Upon receipt of the payment instructions, payer direct clearing system 142 may perform any of the exemplary processes described herein to map or transform elements of the received payment instructions into a format appropriate for processing by transaction processing system 112, and to submit the formatted payment instructions to transaction processing system 112 directly across a secure, programmatic interface for settlement by the one or more transaction processing networks.

To facilitate a performance of these exemplary processes, payer indirect clearing system 122 may maintain, within the one or more tangible, non-transitory memories, a data repository 124 that includes, but is not limited to, a cryptographic library 126, an account database 128, and a transaction database 130. In some instances, cryptographic library 126 may include an asymmetric cryptographic key pair associated with, generated by, or assigned to payer indirect clearing system 122 (e.g., a private cryptographic key and a corresponding public cryptographic key), along with public key certificates associated with one or more additional computing systems within environment 100, such as, but not limited to, payer direct clearing system 142 or other computing systems associated with or operated by a financial institution associated with one or more payees involved in corresponding payment transactions. Account database 128 may include structured or unstructured data records that identify and characterize one or more financial services accounts issued by the payer financial institution to payer 103 and other customers, and in some instances, transaction database 130 may include structured or unstructured data records that identify and characterize one or more exchanges of data (e.g., payment transactions) received from payer device 102 and routed to direct clearing system 142.

Further, and to facilitate a performance of these exemplary processes, payer direct clearing system 142 may maintain, within the one or more tangible, non-transitory memories, a data repository 144 that includes, but is not limited to, a cryptographic library 146, mapping data 148, an account database 150, and a transaction database 152. In some instances, cryptographic library 146 may include an asymmetric cryptographic key pair associated with, generated by, or assigned to payer direct clearing system 142 (e.g., a private cryptographic key and a corresponding public cryptographic key), along with public key certificates associated with one or more additional computing systems within environment 100, such as, but not limited to, payer indirect clearing system 122 or other computing systems associated with or operated by a financial institution associated with one or more payees involved in corresponding payment transactions.

Mapping data 148 may include data that maps or transforms one or more elements of data structured in accordance with a standardized data-interchange format, such as an ISO 20022™ standard data-interchange format, into corresponding elements of data structured in accordance with one or more legacy data-interchange formats, e.g., a legacy data-interchange format associated with and suitable for processing by transaction processing system 112. Account database 150 may include structured or unstructured data records that identify and characterize one or more financial services accounts issued to one or more customers of payer direct clearing system 142, such as a settlement account issued to and maintained on behalf of payer indirect clearing system 122. Further, transaction database 152 may include structured or unstructured data records that identify and characterize one or more exchanges of data (e.g., payment transactions) submitted for settlement using any of the exemplary processes described herein, e.g., based on portions of payment data routed from payer indirect clearing system 122 to payer direct clearing system 142.

Transaction processing system 112 may be associated with, or operated by, the one or more transaction processing networks, examples of which include, but are not limited to, a legacy payment rail that facilitates a clearance and settlement of electronic funds transfer (EFT) transactions between counterparties and a legacy payment rail that facilitates automated funds transfer (AFT) credit transactions between counterparties (e.g., that facilitate payroll processing) and/or AFT debit transactions between counterparties (e.g., that facilitate bill payment transactions, such as mortgage payments, etc.). In some instances, transaction processing system 112 may be configured to receive, from payer direct participant system 142, elements of transaction data structured in accordance with a legacy data-interchange format (e.g., specified within mapping data 148), and to perform any exemplary processes described herein to settle payment transactions based on the legacy transaction data, e.g., to execute the payment transactions.

One or more of peer systems 160, including peer system 162, may perform consensus-based operations that establish and maintain a permissioned distributed ledger. In some instances, the permissioned distributed ledger may immutably record and track selectively encrypted elements of data summarizing a status of one or more payment transactions at discrete temporal positions during one or more of the exemplary transaction settlement, clearance, and reconciliation processes implemented collectively by transaction processing system 112, payer indirect clearing system 122, payer direct clearing system 142, and other direct and indirect clearing systems associated with a payee or payee financial institution (not illustrated in FIG. 1).

Based on an implementation of the exemplary consensus-based processed described herein, peer systems 160 (including peer system 162) may generate one or more ledger blocks of the permissioned distributed ledger that record selectively encrypted portions of payment summary data, settlement status data, or reconciliation status data (e.g., as received from payer indirect clearing system 122, payer direct clearing system 142, and the other payee direct and indirect clearing systems), and may append these newly additional ledger blocks to the permissioned distributed ledger to generate an updated version of the permissioned distributed ledger. In addition to, or as alternate to the selectively encrypted elements portions of payment summary data, settlement status data, or reconciliation status data, the additional ledger blocks may include selectively encrypted pointer data identifying a storage location of that payment summary data, status data, or reconciliation data. Examples of the pointer data include, but are not limited to, an HTML file path, a uniform resource locator (URL), or other information that uniquely identifies a corresponding storage location within the cloud-based data repository.

One or more peer systems 160, including peer system 162, may be configured to broadcast the updated version of the permissioned distributed ledger to payer indirect clearing system 122, payer direct clearing system 142, and the other direct and indirect clearing systems (not illustrated in FIG. 1) that, in conjunction with peer systems 160, collectively establish a permissioned, distributed-ledger network. For example, payer indirect clearing system 122, payer direct clearing system 142, and the other direct and indirect clearing systems may each receive the updated version of the permissioned distributed ledger, e.g., as broadcast by peer systems 160, and may store the updated version of the permissioned distributed ledger within corresponding ones of the tangible, non-transitory memories, e.g., as distributed ledger 170.

To facilitate a performance of any of the exemplary processes described herein, peer system 162 may establish and maintain, within the one or more tangible, non-tangible memories, one or more structured or unstructured data repositories or databases, such as data repository 164. By way of example, data repository 164 may include, but is not limited to, a cryptographic library 166 that includes an asymmetric cryptographic key pair (e.g., a private cryptographic key and a corresponding public cryptographic key) generated by, associated with, or assigned to peer system 162. Peer system 162 may also store a current version of the distributed ledger, e.g., distributed ledger 170, within a corresponding portion of data repository 164. Further, although not illustrated in FIG. 1, each additional peer system of peer systems 160 may include components similar to those described herein in reference to peer system 162, and may store similar elements of data in data repositories establishing within corresponding ones of the tangible, non-transitory memories.

Figure 2A:
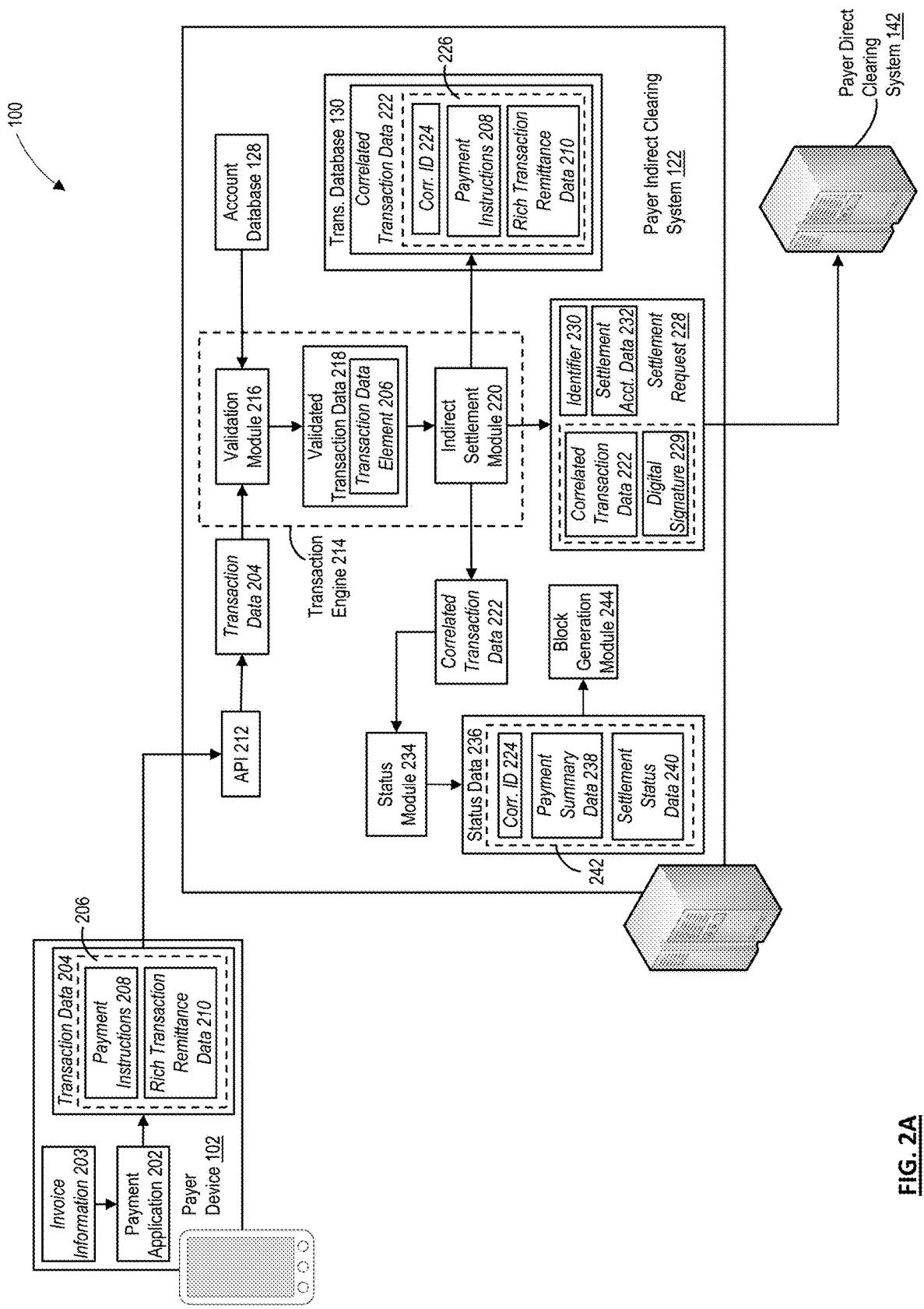
FIGS. 2A, 2B, 3A, 3B, 4, 5, 6A, and 6B illustrate portions of an exemplary computing environment, in accordance with the disclosed embodiments.

Referring to FIG. 2A, the one or more processors of payer device 102 may execute an application program, e.g., payment application 202, that causes payer device 102 to generate transaction data 204 identifying one or more initiated payment transactions. For example, the one or more payment transactions may include to a payment transaction that satisfies an outstanding invoice for products purchased by payer 103 from a corresponding counterparty (e.g., a merchant), and payer device 102 may maintain, within the one or more transitory memories, invoice information 203 that includes, among other things, structured data characterizing the outstanding invoice and enriched content associated with the outstanding invoice.

For example, the outstanding invoice may be associated with a balance of $7,500.00 for products shipped to payer 103 on Apr. 5, 2019, and may be associated with a due date of May 1, 2019. In some instances, the structured data that characterizes the outstanding invoice may include, but is not limited to, remittance information (e.g., an account or routing number associated with a financial services account held by the merchant), the outstanding balance of $7,500.00, and the due date of May 1, 2019. Further, examples of the enriched content associated with the outstanding invoice include, but are not limited to, an electronic copy of one or more pages of the invoice, a packing list associated with the April $5^{th}$ shipment, and additionally, or alternatively, a corresponding purchase order.

In some instances, executed payment application 202 may generate element 206 of transaction data 204, which corresponds to the payment transaction involving the outstanding invoice. For example, executed payment application 202 may determine a value of one or more parameters that characterize the payment transaction based on portions of invoice information 203. Examples of these determined parameter values can include, but are not limited to, a transaction type (e.g., an EFT transaction, an AFT credit or debit transaction, etc.), a transaction amount (e.g., the outstanding balance, a different amount reflecting a credit, etc.), a transaction date or time (e.g., a predetermined or specified time prior to the due date of May $1^{st}$, such as seven days), a payer identifier (e.g., a name or unique identifier of payer 103), an identifier of a source account (e.g., a routing and/or account number of a deposit account held by payer 103 and issued by a corresponding financial institution), an identifier of a payee (e.g., a name or unique identifier of the merchant) and additionally, or alternatively, an identifier of a destination account (e.g., the routing and/or account number of the merchant).

As illustrated in FIG. 2A, payment application 202 may package the determined parameter values into corresponding portions of payment instruction information 208, which may be incorporated into transaction data element 206. Further, executed payment application 202 may also perform operations that further parse invoice information 203 to extract all or a portion of the enriched content (e.g., the electronic copies of the invoice or the purchase order, etc.), and that package the extracted portions of the enriched content into corresponding portions of rich transaction remittance data 210, which may also be included within transaction data element 206. In other instances, rich transaction remittance data 210 may also include additional information that characterizes the payment transaction associated with the outstanding invoice, such as, but not limited to, payment advice characterizing a discrepancy between the transaction amount and the balance of the outstanding invoice.

By way of example, transaction data element 206, and each of payment instruction information 208 and rich transaction remittance data 210, may be structured in accordance with an appropriate data-exchange format, such as the ISO 20022™ standard data-interchange format described herein. Further, executed payment application 202 may package, into corresponding portions of transaction data 204 (e.g., into a header portion, etc.), additional information that, among other things, identifies payer 103 (e.g., a login credential or digital identifier), payer device 102 (e.g., an Internet Protocol (IP) address) and/or executed payment application 102 (e.g., an application cryptogram, such as a hash value, random number, cryptographic key, etc.). Additionally, executed payment application 202 may perform any of the exemplary processes described herein to generate elements of transaction data 204 that are associated with, and characterize, one or more additional payment transactions.

Executed payment application 202 may perform operations that cause payer device 102 to transmit, via a corresponding communications interface (e.g., a transceiver device), transaction data 204 across network 120 to one or more computing systems associated with the financial institution of payer 103, such as, but not limited to, payer indirect clearing system 122. As illustrated in FIG. 2A, payer indirect clearing system 122 may receive transaction data 204 (e.g., via a corresponding communications interface), and a secure, programmatic interface of payer indirect clearing system 122, e.g., application programmatic interface (API) 212, may route transaction data 204 to a transaction engine 214 executed by payer indirect clearing system 122.

A validation module 216 of executed transaction engine 214 may receive transaction data 204, and may perform operations that validate transaction data 204. For example, validation module 216 may access one or more portions of transaction data 204 (e.g., a header portion, a footer portion, etc.) and extract the information that identifies payer 103 (e.g., the login credential or digital assigned to payer 103), payer device 102 (e.g., the IP address), and/or executed payment application 202 (e.g., the application cryptogram). Validation module 216 may perform operations that validate transaction data 204 based on a comparison between the extracted information and corresponding identifiers maintained within account database 128. Additionally, or alternatively, validation module 216 may perform operations that validate transaction data 204 based on a comparison of the extracted application cryptogram to a locally computed copy of the application cryptogram, or based on a determination that the application cryptogram conforms to a predetermined format.

If validation module 216 were unable to validate transaction data 204, executed transaction engine 214 may perform operations that discard transaction data 204, and that cause payer indirect clearing system 122 to generate and transmit an error message to payer device 102 (not illustrated in FIG. 2A). Alternatively, if validation module 216 were able to validate transaction data 204, validation module 216 may package now-validated transaction data 204 into a corresponding portion of validated transaction data 218. As illustrated in FIG. 2A, validation module 216 may provide validated transaction data 218, which includes now-validated transaction data element 206, an input to an indirect settlement module 220 of executed transaction engine 214.

Indirect settlement module 220 may perform operations that assign a unique alphanumeric identifier, e.g., a correlation identifier, to each element of validated transaction data 218. The assigned correlation identifiers may be characterized by a predetermined length or a predetermined structure, and examples of the correlation identifiers include, but are not limited to, a random number or a hash value generated based on portions of corresponding elements of validated transaction data 218. In some instances, indirect settlement module 220 may package each element of validated transaction data 218, and the assigned correlation identifier, into a corresponding element of correlated transaction data 222, which indirect settlement module 220 may store within transaction database 130.

By way of example, indirect settlement module 220 may assign a correlation identifier 224 to transaction data element 206 (e.g., as included within validated transaction data 218), and may package correlation identifier 224 and transaction data element 206 into a corresponding element 226 of correlated transaction data 222. Indirect settlement module 220 may perform similar assignment and storage operations for each additional element of validated transaction data 218 and each of the additional correlation identifiers. Further, as each element of validated transaction data 218 may be structured in accordance with the ISO 20022™ standard data-interchange format, the elements of correlated transaction data 222 may also include structured payment instruction information (e.g., payment instruction information 208 of transaction data element 206) and rich transaction remittance data (e.g., rich transaction remittance data 210 of transaction data element 206).

In some instances, the predetermined length, format, or structure of the assigned correlation identifiers may be specified by one or more additional computing systems operating within environment 100 having access to transaction processing network 100, such as payer direct clearing system 142, and indirect settlement module 220 may compute each of the correlation identifiers based on an algorithm or other rubric provided by payer direct clearing system 142. In other instances, indirect settlement module 220 may perform operations that request and receive a portion of the correlation identifiers from payer direct clearing system 142, which itself may generate the requested portion of the correlation identifiers or obtain the requested portion of the correlation identifiers from transaction processing system 112.

As described herein, the payer financial institution may represent an indirect participant in the transaction processing networks that settle and clear the payment transaction specified within correlated transaction data 222, and as such, neither the payer financial institution nor payer indirect clearing system 122 may access the one or more transaction networks that clear and settle the payment transactions. In some instances, indirect settlement module 220 may perform additional operations that package all or a portion of correlated transaction data 222 into a request 228 for indirect settlement of the payment transactions. Further, to establish an integrity of each element of correlated transaction data 222, indirect settlement module 220 may also apply a digital signature 229 to the correlated transaction data 222 (e.g., using any appropriate key generation algorithm in conjunction with a private cryptographic key assigned to payer indirect clearing system 122), and package the applied digital signature 229 into a corresponding portion of settlement request 228.

In some instances, indirect settlement module 220 may also package, into corresponding portions of settlement request 228, an identifier 230 of payer indirect clearing system 122 (e.g., an IP address, a unique digital identifier, such as a cryptogram or hash value, etc.). Additionally, or alternatively, indirect settlement module 220 may also package, into a corresponding portion of settlement request 228, data 232 that identifies a settlement account maintained on behalf of the payer financial institution by a direct participant in the one or more transaction processing network, e.g., the financial institution associated with payer direct clearing system 142. Indirect settlement module 220 may also perform operations that store identifier 230, settlement account data 232, and the elements of correlated transaction data within a portion of data repository 124, e.g., within the data records of transaction database 130.

Additionally, or alternatively, indirect settlement module 220 may perform also operations that transmit elements of correlated transaction data 222 across network 120 to one or more computing systems associated with a cloud-based repository, e.g., via a secure programmatic interface (not illustrated in FIG. 2A). In some instances, rather than storing actual elements of correlated transaction data 222 within transaction database 130, e.g., in conjunction with identifier 230 and settlement account data 232, transaction database 130 may maintain pointer data identifying a location of each of the elements of correlated transaction data 222 within the cloud-based repository.

Executed transaction engine 214 may perform operations that cause payer indirect clearance system 122 to transmit settlement request 228 across network 120 to payer direct clearing system 142, e.g., through a secure, programmatic interface. In some instances, payer direct clearing system 142 may perform any of the exemplary processes described herein to clear and reconcile each of the payment transactions specified within settlement request 228, and to submit data characterizing these cleared and reconciled payment transaction to transaction processing system 112, e.g., for settlement in accordance with the reconciled transaction parameter values. Further, and as described herein, payer direct clearing system 142 may perform additional operations that, in conjunction with peer systems 160, record selectively encrypted elements of payment summary data, reconciliation status data, and/or settlement status data within one or more ledger blocks of a permissioned distributed ledger, and facilitate an implementation of time-efficient and cryptographically secure process for reconciling the settled payment transactions at payer indirect clearing system 122.

Referring back to FIG. 2A, executed transaction engine 214 may also provide correlated transaction data 222 as an input to a status module 234, which may process portions of correlated transaction data 222 to generate discrete elements of status data 236, which characterize each of the initiated payment transaction specified within correlated transaction data 222. By way of example, and for each of the initiated payment transactions, transaction status module 234 may extract a corresponding one of the correlation identifiers, and package portions of the payment instruction information (e.g., the transaction parameter values described herein) and/or rich transaction remittance data into a corresponding element of payment summary data. Further, and for each of the payment transactions, transaction status module 234 may generate a corresponding element of settlement status data, which confirms the current status of the indirect settlement process, i.e., that payer indirect clearing system 122 transmitted settlement request 228 to direct clearing system 142).

For example, and for the particular payment transaction involving the outstanding invoice for $7,500.00, transaction status module 234 may access element 226 of correlated transaction data 222. As described herein, element 226 includes correlation identifier 224, which uniquely identifies the particular payment transaction, and transaction data element 206, which includes payment instruction information 208 and rich remittance transaction data 210. As illustrated in FIG. 2A, transaction status module 234 may package all or a portion of payment instruction information 208 into corresponding portions of payment summary data 238 (e.g., either alone or in conjunction with all, or a portion, of rich remittance transaction data 210), and may generate settlement status data 240 that confirms the current status of the payment transaction within the indirect clearance and settlement processes described herein.

In some instances, status module 234 may package correlation identifier 224, payment summary data 238, and settlement status data 240 into a corresponding element 242 of status data 236, and may perform any of the processes described herein to generate an additional element of status data 236 for each additional payment transaction specified within correlated transaction data 222. Transaction status module 234 may provide payment summary and status data 236 as an input to a block generation module 244, which may be executed by the one or more processors of payer indirect clearing system 122.

In some instances, the elements of payment summary data and settlement status data that characterize each of the initiated payment transactions may include actual values of corresponding transaction parameters (e.g., within the payment summary data) or actual status data characterizing the position the initiated payment transaction within the indirect settlement processes described herein (e.g., within the settlement status data). In other instances, and consistent with the disclosed exemplary embodiments, one or more of the elements of payment summary data and settlement status data include pointer data that identifies a storage location of an appropriate data element within a cloud-based repository to accessible to payer indirect clearing system 122 and/or payer direct clearing system 142, e.g., across network 120 via the secure programmatic interface. Examples of the pointer data include, but are not limited to, an HTML file path, a uniform resource locator (URL), or other information that uniquely identifies a corresponding storage location within the cloud-based data repository.

Figure 2B:
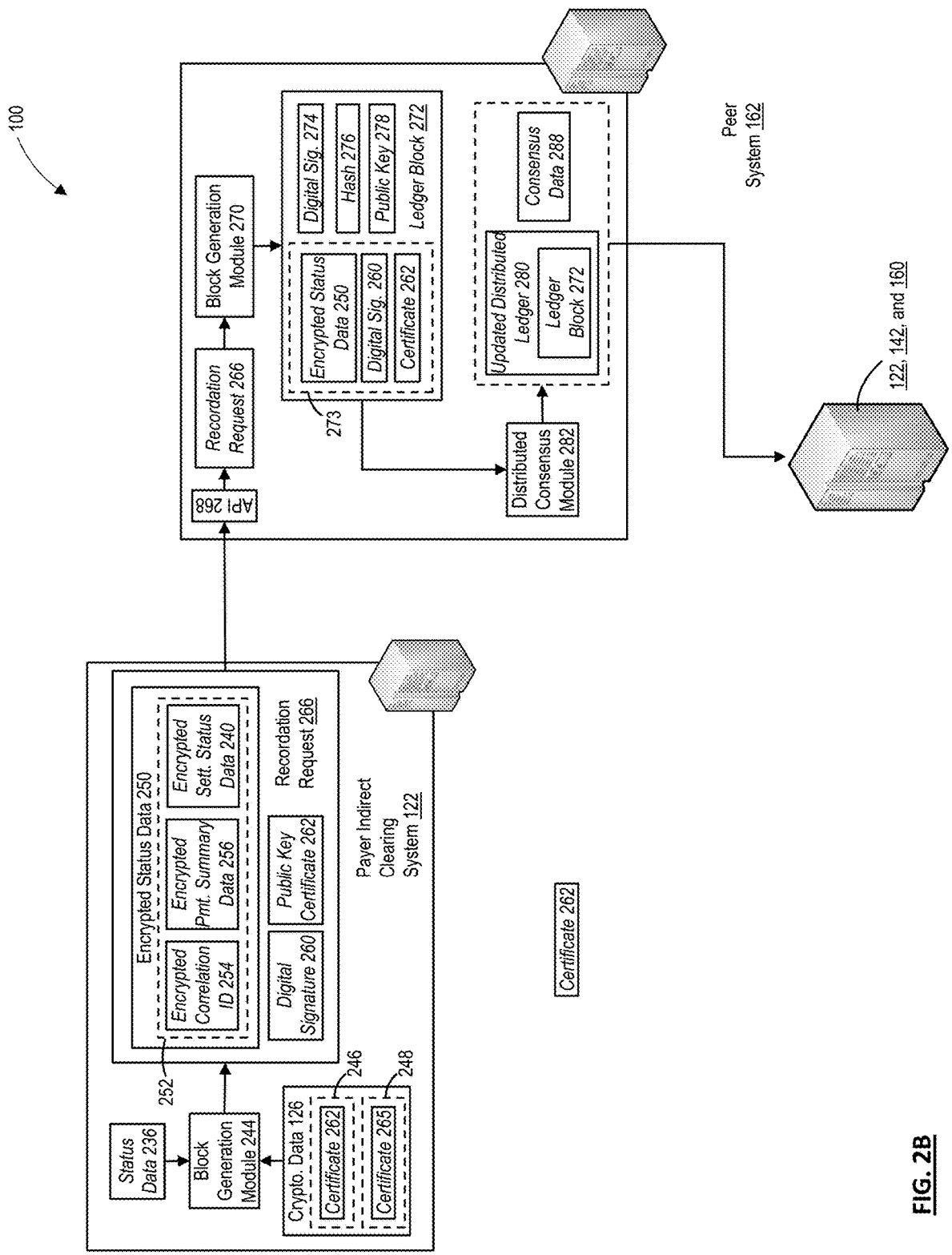

Referring to FIG. 2B, executed block generation module 244 may receive status data 236, which includes element 242 characterizing the particular payment transaction for the outstanding invoice of $7,500.00, and may access cryptographic library 126, e.g., as maintained within data repository 124. In some instances, block generation module 244 may perform operations that extract, from cryptographic library 126: (i) cryptographic data 246 that includes a private cryptographic key associated with payer indirect clearing system 122 and a corresponding public key certificate 262, which includes a corresponding public cryptographic key of payer indirect clearing system 122; and (ii) cryptographic data 248 that includes a public key certificate 265 of payer direct clearing system 142, which includes a corresponding public cryptographic key.

Block generation module 244 may perform operations that encrypt each of the status data 236 using the public cryptographic key of payer direct clearing system 142, and may generate corresponding elements of encrypted status data 250. By way of example, element 252 of encrypted status data 250 characterizes the particular payment transaction associated with the outstanding invoice of $7,500.00, and includes an encrypted correlation identifier 254 (e.g., based on correlation identifier 224), encrypted payment summary data 256 (e.g., based on payment summary data 238), and encrypted payment status data (e.g., based on settlement status data 240). Although not illustrated in FIG. 2B, encrypted status data 250 may include additional encrypted elements that characterize each of the additional payment transaction characterized by status data 236, each of which include encrypted information similar to that included within element 252.

In some instances, block generation module 244 may apply a digital signature 260 to the elements of encrypted status data 250 using the private cryptographic key of payer indirect clearing system 122, e.g., as extracted from cryptographic data 246. Block generation module 244 may package encrypted status data 250, digital signature 260, and public key certificate 262 of payer indirect clearing system 122 into corresponding portions of a recordation request 266. As illustrated in FIG. 2B, block generation module 244 may perform operations that cause payer indirect clearing system 122 to broadcast recordation request 266 across network 120 to each of peer systems 160, including peer system 162.

A programmatic interface of peer system 162 (and each additional or alternate one of peer systems 160), such as application programming interface (API) 268, may receive recordation request 266, and may route recordation request 266 to a block generation module 270. When executed by the one or more processors of peer system 162 (and each additional or alternate one of peer systems 160), block generation module 270 may perform operations that generate a new ledger block 272 that includes encrypted status data 250, digital signature 260, and public key certificate 262 of payer indirect clearing system 122. Block generation module 270 may also perform operations that apply a digital signature 274 to a payload 273 of new ledger block 272, e.g., encrypted status data 250, digital signature 260, and public key certificate 262, using a corresponding private cryptographic key of peer system 162 maintained within cryptographic library 166.

Further, block generation module 270 may also generate a hash value 276 based on an application of any appropriate hash algorithm to payload 273, either alone or in conjunction with a corresponding public cryptographic key 278 of peer system 162. In some instances, block generation module 270 may perform operations that digital signature 274, hash value 276, and public cryptographic key 278 into corresponding portions of new ledger block 272, along with payload 273, e.g., encrypted status data 250, digital signature 260, and public key certificate 262.

Peer system 160 (and each additional or alternate one of peer systems 160) may perform additional operations that append to ledger block 272 to a prior version of the permissioned distributed ledger to generate a latest, longest version of the permissioned distributed ledger (e.g., an updated distributed ledger 280). For example, the additional operations may be established through distributed consensus among peer systems 160, and may include, but are not limited to, the calculation of an appropriate proof-of-work or proof-of-stake by a distributed consensus module 282 prior to the other peer systems. In certain aspects, peer system 162 may broadcast evidence of the calculated proof-of-work or proof-of-stake to the additional ones of peer systems 160 across network 120 (e.g., as consensus data 184).

Peer system 162 may also broadcast updated distributed ledger 280, which represents the latest, longest version of the distributed ledger, to the additional ones of peer systems 160 operating within environment 100 and additionally or alternatively, to each of the network-connected systems that participate in the permissioned, distributed-ledger network, such as payer indirect clearing system 122 and payer direct clearing system 142. In some instances, not illustrated in FIG. 2B, each of payer indirect clearing system 122, payer direct clearing system 142, and the additional ones of peer systems 160 may perform operations that store updated distributed ledger 280 within respective portions of data repository 124, data repository 144, and/or data repository 164, e.g., to replace distributed ledger 170.

In one example, new ledger block 272 of updated distributed ledger 280 may include, within payload 273, encrypted payment summary data and encrypted settlement status data for one or more initiated payment transactions, e.g., within encrypted status data 250. In other examples, encrypted status data 250 may include encrypted elements of pointer data that identify a storage location of corresponding elements of the payment status data within one or more of the cloud-based repositories described herein, and additionally, or alternatively, encrypted elements of pointer data that identify a storage location of corresponding elements of the settlement status data within the one or more cloud-based repositories.

As described herein, payer indirect clearing system 122 may perform further operations that transmit settlement request 228 across network 120 to one or more computing systems associated with, or operated by, the direct participant in the transaction processing networks, such as, but not limited to, payer direct clearing system 142. In some instances, described below in reference to FIGS. 3A and 3B, payer direct clearing system 142 may perform any of the exemplary processes described herein to submit formatted payment instructions characterizing the payment transactions specified within settlement request 228 directly to transaction processing system 112 for settlement. Payer direct clearing system 142 may also perform operations that, in conjunction with peer systems 160, record selectively encrypted elements of payment summary data, settlement status data, and/or reconciliation status data within one or more ledger blocks of a permissioned distributed ledger, which facilitate an implementation of cryptographically secure and tamper-resistant processes for reconciling the each of the settled payment transactions at payer indirect clearing system 122.

Figure 3A:
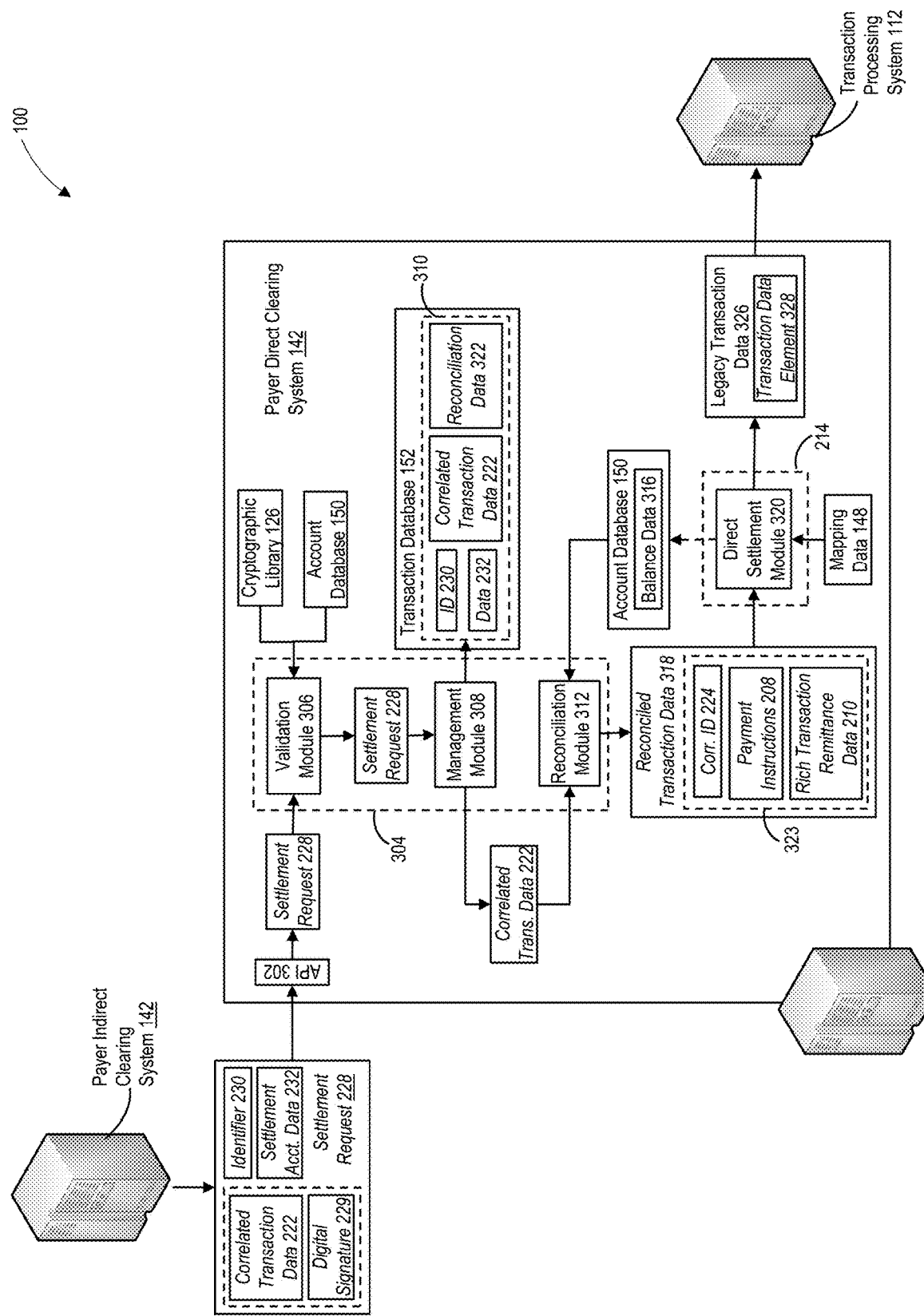

Referring to FIG. 3A, payer direct clearing system 142 may receive settlement request 228, e.g., across network 120 from payer indirect clearing system 122. As described herein, settlement request 228 may include, among other things, correlated transaction data 222, which identifies and characterizes one or more payment transaction initiated at payer device 102, along with identifier 230 that identifies payer indirect clearing system 122 (e.g., an IP address, a cryptogram, etc.) and/or data 232 that identifies a settlement account of payer indirect clearing system 122. As illustrated in FIG. 3A, a secure, programmatic interface of payer direct clearance system 142, e.g., API 302, may route settlement request 228 to a transaction engine 304 executed by the one or more processors of payer direct clearance system 142.

In some instances, a validation module 306 of executed transaction engine 304 may receive settlement request 228 and perform operations that validate settlement request 228. By way of example, validation module 306 may access settlement request 228, and may extract identifier 230 (e.g., an IP address, a cryptogram, etc. of payer indirect clearing system 122) and additionally, or alternatively, settlement account data 232 (e.g., an account number, a tokenized account number, etc. of the settlement account held by of payer indirect clearing system 122). Validation module 306 may, for example, perform operations that authenticate an identity of payer indirect clearing system 122 based on a comparison of identifier 230, such as the IP address, against one or more data records of account database 150 that correspond to the settlement account of payer indirect clearing system 122 (e.g., that include or are associated with settlement account data 232).

In other examples, validation module 306 may also authenticate the identity of payer indirect clearing system 122 based on a validation of the cryptogram extracted from identifier 230, e.g., based on a comparison with a locally computed copy of the extracted cryptogram or a determination that the extracted cryptogram conforms to a predetermined format. Further, in some examples, validation module 306 may perform operations that validate digital signature 229 using a public cryptographic key of payer indirect clearing system 122 (e.g., as maintained within cryptographic library 146), and based on the validation of digital signature 229, not only authenticate the identity of payer indirect clearing system 122, but also verify an integrity settlement request 228.

If validation module 216 were unable to authenticate the identity of payer indirect clearing system 122 or to verify the integrity of settlement request 228, executed transaction engine 304 may perform operations that discard settlement request 228. In some instances, executed transaction engine 304 may perform operations that cause payer direct clearing system 142 to generate and transmit an error message (not illustrated in FIG. 3A).

Alternatively, if validation module 306 were able to authenticate the identity of payer indirect clearing system 122 and verify the integrity of settlement request 228, validation module 216 may route settlement request 228 to a management module 308 of execution transaction engine 304. In some instances, management module 308 may perform operations that parse settlement request 228, and extract identifier 230 of payer indirect clearance system 122, settlement account data 232, and correlated transaction data 222. As illustrated in FIG. 3A, management module 308 may access transaction database 152 (e.g., as maintained within data repository 144), and may perform operations that link together and store identifier 230 and correlated transaction data 222 within one or more data records 310 of transaction database 152.

Additionally, or alternatively, management module 308 may perform operations that transmit identifier 230 and correlated transaction data 222 across network 120 to the one or more computing systems associated with the cloud-based repository, e.g., via a secure programmatic interface (not illustrated in FIG. 3A). In some instances, rather than storing actual elements of correlated transaction data 222 within transaction database 152, e.g., in conjunction with identifier 230, transaction database 152 may maintain pointer data identifying a location of each of the elements of correlated transaction data 222 within the cloud-based repository.

Management module 308 may also provide correlated transaction data 222 to a reconciliation module 312 of executed transaction engine 304. In some instances, reconciliation module 312 may perform operations that, among other things, verify that an available balance in the settlement account of payer indirect clearing system 122 is equivalent to, or exceeds, an aggregated transaction value of the payment transactions submitted for settlement by payer indirect transaction system 122. By way of example, reconciliation module 312 may access one or more data records of account database 150, which corresponds to the settlement account of payer indirect clearing system 122 (and with includes or references a portion of settlement account data 232), and access balance data 316, which specifies the available balance of the settlement account. Further, reconciliation module 312 may also access each element of correlated transaction data 222, identify a transaction amount corresponding to each of the access elements, and compute an aggregate transaction value across the payment transactions submitted by payer indirect clearing system 122 for settlement.

If, for example, reconciliation module 312 were to determine that the available balance of the settlement account is equivalent to, or exceeds the aggregate transaction value, reconciliation module 312 may establish that the available balance within the settlement account is sufficient to fund each of the initiated payment transactions (e.g., initiated transfers to the destination accounts of the counterparties). In some instances, reconciliation module 312 may package each element of correlated transaction data 222, including element 226 representative of the payment transaction that funds the outstanding invoice for $7,500.00, into a corresponding portion of reconciled transaction data 318, which reconciliation module 312 may provide as an input to a direct settlement module 320 of executed transaction engine 304.

Further, as illustrated in FIG. 3A, reconciliation module 312 may also generate elements of reconciliation data 322 that, for example, identify the available balance of the settlement account and/or the aggregate value of the initiated payment transactions, and confirm that the available balance of the settlement account is sufficient to fund the initiated payment transactions (e.g., as specified within the elements of reconciled transaction data 318). Further, reconciliation module 312 may perform operations that store reconciliation data 322 within a portion of transaction database 152 associated with settlement request 228, e.g., within data records 310, and additionally, or alternatively, perform any of the exemplary processes described herein to store reconciliation data 322 within the cloud-based repository accessible to payer indirect clearing system 122 or to payer direct clearing system 142.

In other instances, not illustrated in FIG. 3A, reconciliation module 312 may determine that the aggregate transaction value exceeds the available balance of the settlement account and as such, that the available balance is insufficient to fund each of the initiated payment transactions. Based on tis determination, reconciliation module 312 may access the elements of correlated transaction data 222 (e.g., which characterize corresponding ones of the initiated payment transactions), and modify a transaction parameter value within one or more the accessed elements to reduce the aggregate transaction value for consistency with the available balance. For example, reconciliation module 312 may reduce the transaction amount characterizing a particular one of the initiated payment transactions (e.g., within a corresponding element of correlated transaction data 222), or may delay a transaction date or time for an additional one of the initiated payment transactions (e.g., any may delete a corresponding one of the accessed elements from correlated transaction data 222.

Further (not illustrated in FIG. 3A), reconciliation module 312 may package the modified elements of element of correlated transaction data 222 into corresponding portions of reconciled transaction data 318. Reconciliation module 312 may also generate additional elements of reconciliation data 322 that, for example, identify the aggregate value of the payment transactions (e.g., prior to modification), and/or a reduced aggregate value of the modified payment transactions and further, identify the modification applied to the one or more elements of correlated transaction data 222 (e.g., that resulted in the reduced aggregate value).

Referring back to FIG. 3A, direct settlement module 320 may receive reconciled transaction data 318, and may perform operations that process each element of reconciled transaction data 318 and generate a corresponding element of legacy transaction data 326 suitable for submission to and processing by transaction processing system 112. For example, each element of reconciled transaction data 318 may be structured in accordance with the ISO 20022™ standard data-interchange format and as such, may include not only payment instruction information that specifies corresponding values of transaction parameters, but also corresponding elements of rich remittance transaction data.

As illustrated in FIG. 3A, direct settlement module 320 may access mapping data 148, and extract legacy mapping data that maps or transforms one or more elements of data structured in accordance the ISO 20022™ standard data-interchange format to corresponding data elements of data structured a legacy data-interchange format associated with by transaction processing system 112. For example, direct settlement module 320 may access an element 323 of reconciled transaction data 318, and extract payment instruction information 208 and rich transaction remittance data 210, each of which characterize the payment transaction that satisfies the outstanding $7,5000.00 invoice. In some instances, legacy mapping data may indicate an inability of transaction processing system 112 to process rich transaction remittance data 210, and based on an application of legacy mapping data 221 to portions of payment instruction information 208, indirect settlement module 220 may generate corresponding an element 328 of legacy transaction data 326 structured in accordance with the legacy data-interchange format.

Direct settlement module 320 may also perform operations that package element 328 into a corresponding portion of legacy transaction data 326, and may perform similar operations that process each additional element of reconciled transaction data 318 and generate a corresponding element of legacy transaction data 326 structured in accordance with the legacy data-interchange format. Direct settlement module 320 may also package, into a corresponding portion of legacy transaction data 326 (e.g., into a header portion, etc.), additional information that, among other things, identifies payer direct clearing system 142 (e.g., an Internet Protocol (IP) address) and/or executed transaction engine 304 (e.g., an application cryptogram, such as a hash value, random number, cryptographic key, etc.).

In some instances, direct settlement module 320 may further process each element of legacy transaction data 326, including element 328, to access an identifier of a source account (e.g., the account number, etc., or the payer's deposit account at the payer financial institution), and to replace that accessed identifier with a corresponding identifier of the settlement account of payer indirect clearing system 122 (e.g., a portion of an actual or tokenized account number). Additionally, or alternatively, one or more of the elements of legacy transaction data 326 may aggregated, or "netted," prior to settlement, or may be combined with other legacy transaction data, e.g., in a batch settlement process. Further, although not depicted in FIG. 3A, direct settlement module 320 may also perform operations that access account database 150, and modify account balance data 316 to reflect a debit consistent with the aggregated transaction amount across all of the initiated payment transactions characterized by legacy transaction data 326.

As illustrated in FIG. 3A, direct settlement module 320 may perform operations that cause payer direct clearing system 142 to transmit legacy transaction data 326, including element 328 that characterizes the payment transaction associated with the outstanding $7,5000.00 invoice, across network 120 to transaction processing system 112 (e.g., as elements of request data). A secure, programmatic interface maintained by transaction processing system 112, such as an API, may receive and route legacy transaction data 326 to one or more application modules that, when executed by the one or more processors, perform operations that validate legacy transaction data 326 and that settle each of the initiated payment transactions in accordance with the elements of legacy transaction data 326, e.g., alone or in conjunction within other computing systems operating within environment 100.

In some instances, by settling the initiated payment transactions, transaction processing system 112 may perform operations that execute each of the initiated payment transactions in accordance with the elements of legacy transaction data 326. Further, and as described herein, the secure programmatic interface maintained by transaction processing system 112, e.g., the API, may be inaccessible to payer indirect clearing system 122 or to any of the application programs executed by payer indirect clearing system.

Figure 3B:
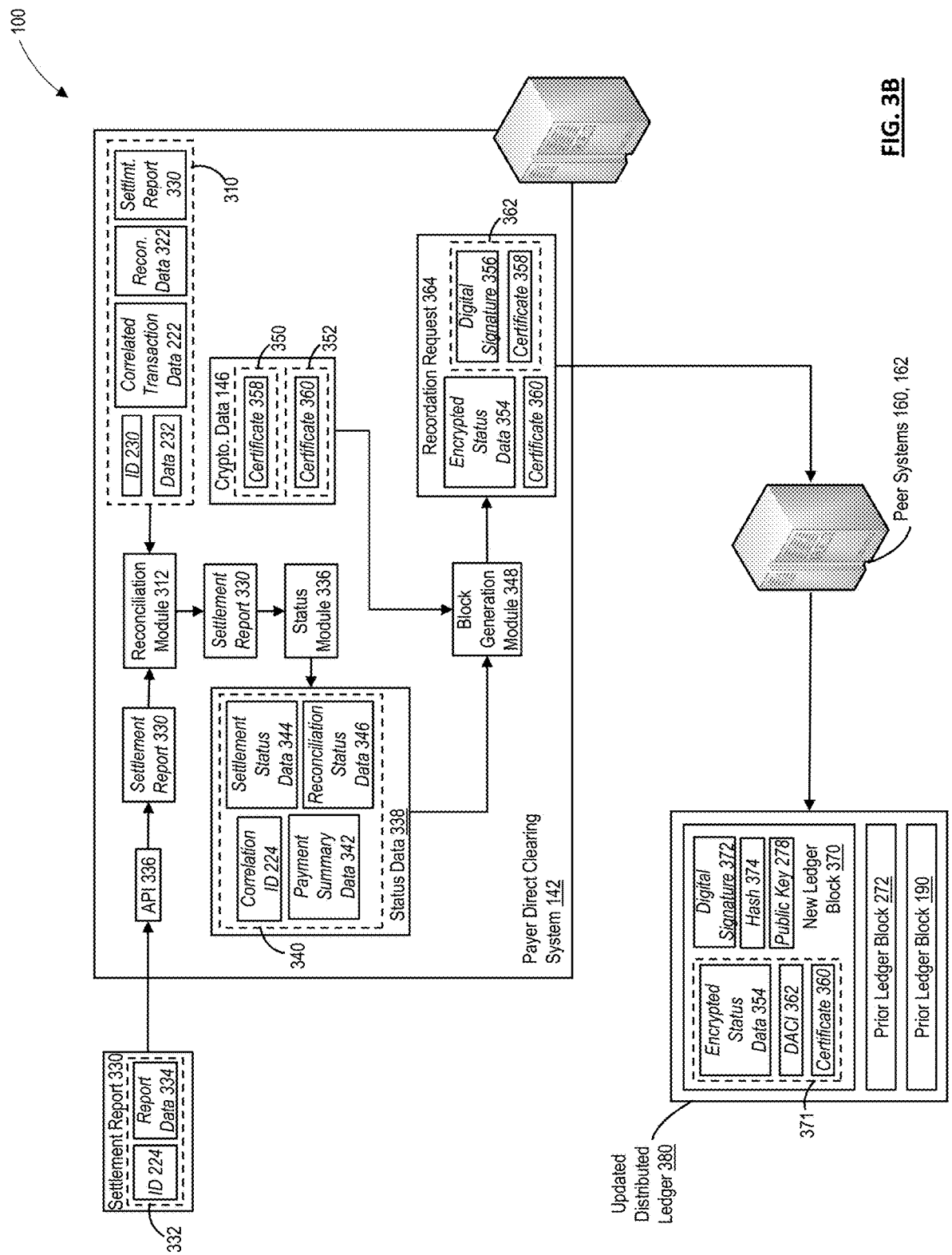

Referring to FIG. 3B, and during the settlement and execution process, transaction processing system 112 may generate settlement report 330 that identifies the payment transaction submitted for settlement (e.g., via a corresponding one of the correlation identifiers) and a status of the payment transactions during the settlement process (e.g., successfully settled, rejected, etc.). For example, and for the payment transaction associated with the outstanding $7,500.00 invoice from payer 103 to the merchant, an element 332 of settlement report 330 may include correlation identifier 224 and report data 334 indicative of the successful settlement of the payment transaction and the transfer of the $7,500.00 from the settlement account of payer indirect clearing system 122 to the destination account of the merchant (e.g., as specified within element 328 of legacy transaction data 326).

In some instances, transaction processing system 112 may perform operations that transmit settlement report 330 across network 120 to payer direct clearing system 142, e.g., via a secure programmatic interface, such as API 336. As illustrated in FIG. 3B, API 336 may receive settlement report 330, and route settlement report 330 back to reconciliation module 312, which may perform further reconciliation processing based on the correlated transaction data 222 and reconciliation data 322 (e.g., as maintained within data records 310 of transaction database 152).

By way of example, and based on portions of settlement report 330, reconciliation module 312 may perform operations that confirm a successful (or alternatively, unsuccessful) settlement of each of the payment transactions submitted to transaction processing system 112, e.g., as specified within correlated transaction data 222 and/or reconciliation data 322. Further, reconciliation module 312 may also perform operations that confirm an aggregated transaction value of the settled transactions corresponds to the aggregated transaction value of the submitted payment transactions (e.g., as debited from the settlement account of payer indirect clearing system 122). In an event that reconciliation module 312 were to detect an unsuccessfully settled one of the submitted payment transactions, or an inconsistency between the submitted and settled payment transactions, reconciliation module 312 may modify a portion of reconciliation data 322 to reflect the detected inconsistency.

Further, in some instances, reconciliation module 312 may perform operations that store settlement report 330 within a portion of transaction database 152 associated with settlement request 228, e.g., within data records 310 (or additionally, or alternatively, within the one or more accessible, cloud-based data repositories described herein). Reconciliation module 312 may also provide settlement report 330 as an input to a status module 336. In some instances, status module 336 may process portions of correlated transaction data 222, reconciliation data 322, and settlement report 330 to generate elements of status data 338, which summarize each of the payment transaction submitted for settlement, and identify a reconciliation and a settlement status for each of the submitted payment transactions.

By way of example, and for each of the submitted payment transactions, status module 336 may extract a corresponding one of the correlation identifiers from settlement report 330. Status module 336 may also access data records 310 within transaction database 152 (e.g., which are associated with settlement request 228), and for each of the extracted correlation identifiers, obtain a corresponding element of correlated transaction data 222 (e.g., that summarizes the corresponding payment transaction), a corresponding element of settlement report 330 (e.g., that characterizes a settlement status of the corresponding payment transaction), and a corresponding element of reconciliation data 322 (e.g., that identifies an outcome of the reconciliation process for the corresponding payment transaction). Further, and for each of the submitted payment transactions, status module 336 may generate a corresponding element of status data 338 that includes the extracted correlation identifier and all, or a portion of, each of the extracted elements of correlated transaction data 222, settlement report 330, and/or reconciliation data 322.

For example, and for the particular payment transaction involving the outstanding invoice for $7,500.00, status module 336 may generate an element 340 of status data 338 that include, but is not limited to: correlation identifier 224; payment summary data 342 (e.g., that includes transaction parameter values extracted from correlated transaction data 222), settlement status data 344 (e.g., that includes information characterizing a successful settlement of the payment transaction and transfer of the $7,500.00 to the destination account of the merchant, as extracted from settlement report 330), and reconciliation status data 346 (e.g., that includes information characterizing a successful reconciliation of the $7,500.00 payment against the balance available within the settlement account of payer indirect clearing system 122, as extracted from reconciliation data 322). Further, status module 336 may perform any of the exemplary processes described herein to generate an additional element of status data 338 for each of the submitted payment transactions. As illustrated in FIG. 3B, status module 336 may provide status data 338 as an input to a block generation module 348, which may be executed by the one or more processors of payer direct clearing system 142.

Executed block generation module 348 may receive status data 338, and may access cryptographic library 146, e.g., as maintained within data repository 144. In some instances, block generation module 348 may perform operations that extract, from cryptographic library 146: (i) cryptographic data 350 that includes a private cryptographic key associated with payer direct clearing system 142 and a public key certificate 358 of payer direct clearing system 142, which includes a corresponding public cryptographic key; and (ii) cryptographic data 352 that includes a public key certificate 360 of payer indirect clearing system 122, which includes a corresponding public cryptographic key.

Block generation module 348 may perform operations that encrypt each of the elements of status data 338 using the public cryptographic key of payer indirect clearing system 122 (e.g., as extracted from public key certificate 360), and may generate corresponding elements of encrypted status data 354. In some instances, block generation module 348 may apply a digital signature 356 to the elements of encrypted status data 354 based on the private cryptographic key of payer direct clearing system 142 (e.g., as extracted from cryptographic data 350). Further, and as illustrated in FIG. 3B, block generation module 348 may package encrypted status data 354, digital signature 356, public key certificate 358 of payer direct clearing system 142, and public key certificate 360 of payer indirect clearing system 122 into corresponding portions of a recordation request 364.

In some instances, digital signature 356 and public key certificate 358 may collectively represent data access control information 362 that enables one or more computing systems within environment 100, such as payer indirect clearing system 122, to establish an integrity and authenticity of encrypted status data 354. Further, the inclusion of public key certificate 360 within recordation request 364 may enable payer indirect clearing system 122 to identify encrypted data capable of decryption using a corresponding private cryptographic key. As illustrated in FIG. 3B, block generation module 348 may perform operations that cause payer direct clearing system 142 to broadcast recordation request 364 across network 120 to each of peer systems 160, including peer system 162.

Peer system 162 may perform any of the exemplary, consensus-based processes described herein to validate recordation request 364 and to package all, or a portion, of recordation request 364 into a new ledger block. Through one or more of the consensus-based processes described herein, peer system 162 may generate a latest, longest version of the permissioned distributed ledger, e.g., an update to distributed ledger 280, that includes the newly generated ledger blocks, and broadcast the updated distributed ledger to payer indirect clearing system 122, payer direct clearing system 142, additional ones of peer system 160, and to other computing systems and devices that participate in the permissioned distributed-ledger network operating within environment 100, e.g., for storage within a corresponding data repository.

For example, as illustrated in FIG. 3B, one or more of peer system 160, including peer system 162, may generate an updated distributed ledger 380 that include a new ledger block 370 appended to one or more prior ledger blocks, such as prior ledger block 272. A payload portion 371 of new ledger block 370 may include, among other things, encrypted status data 354, data access control information 362 (e.g., which itself includes digital signature 356 and public key certificate 358 of payer direct clearing system 142), and public key certificate 360 of payer indirect clearing system 122. New ledger block 370 may also include a digital signature 372 applied to payload 371, e.g., using a corresponding private cryptographic key of peer system 162, and a hash value 374 computed based on an application of any appropriate hash algorithm to payload 371 and digital signature 372, either alone or in conjunction with a corresponding public cryptographic key 278 of peer system 162.

In some instances, and as described herein, the elements of payment summary data, settlement status data, and reconciliation status data that characterize each of payment transactions within new ledger block 370, and within updated distributed ledger 380, may include actual values of corresponding transaction parameters (e.g., within the payment summary data), actual status data characterizing the position the payment transaction within the indirect settlement processes described herein (e.g., within the settlement status data), or actual reconciliation data characterizing an outcome of the reconciliation process for the payment transaction (e.g., within the reconciliation status data). In other instances, and consistent with the disclosed exemplary embodiments, one or more of these elements of payment summary data and settlement status data may instead include pointer data that identifies a storage location of an appropriate data element within a cloud-based repository to accessible to payer indirect clearing system 122, e.g., across network 120 via the secure programmatic interface.

In some examples, described herein, payer direct clearing system 142 may receive a settlement request, e.g., settlement request 228 of FIG. 2A, that characterizes one or more payment transactions initiated by devices in communication with payer indirect clearing system 122. As payer direct clearing system 142 may be associated with a direct participant in one or more transaction processing networks capable of settling each of the initiated payment transactions, payer direct clearing system 142 may maintain a settlement account for payer indirect clearing system 122, and may perform operations that on behalf of payer indirect clearing system 122, clear these initiated payment transactions against funds maintained in the settlement account and submit corresponding payment instructions to computing systems associated with the one or more transaction processing networks for settlement.

Although payer direct clearing system 142 may receive a settlement report characterizing a settlement status of each of the payment transactions after submission of the corresponding payment instructions to the one or more transaction processing networks, current limitations on the processing cycle of these transactions processing networks, and of the direct participants in these transaction processing networks, may delay the provisioning of payment summary and reconciliation data to payer indirect clearing system 122 by several additional business days. While these delays may pose inconveniences to the customers of the financial institution that operates payer indirect clearing system 122, the pending and unreconciled status of these payment transactions at payer indirect clearing system 122 can increase a susceptibility of payer indirect clearing system 122 to instances of fraudulent activity, and further increase a computational workload necessary to detect and correct and impact of these fraudulent activities during an eventual reconciliation process.

In some exemplary embodiments, one or more participants in a permissioned, distributed-ledger network, such as payer indirect clearing system 122 and payer direct clearing system 142 of FIG. 1, may perform operations that record certain elements of payment summary, reconciliation status, and settlement status data within a cryptographically secure and permissioned distributed ledger at discrete temporal positions within the payment clearance, reconciliation, and settlement process. For instance, and as described herein, payer direct clearing system 142 may perform operations that record, within one or more ledger blocks of the permissioned distributed ledger, data summarizing a settlement and subsequent reconciliation of one or more payment transactions submitted by payer indirect clearing system 122. By encrypting the elements of payment, reconciliation, or settlement data using a public cryptographic key of payer indirect clearing system 122, certain of these exemplary processes may enable payer indirect clearing system 122 to access, in real time, the encrypted elements of payment summary, reconciliation status, or settlement status data, and to perform further operations and reconcile one or more initiated payment transactions, and post these reconciled transactions to customer accounts, without the delays associated with conventional transaction processing and further, without the increased potential for fraudulent activity associated with these delays.

Figure 4:
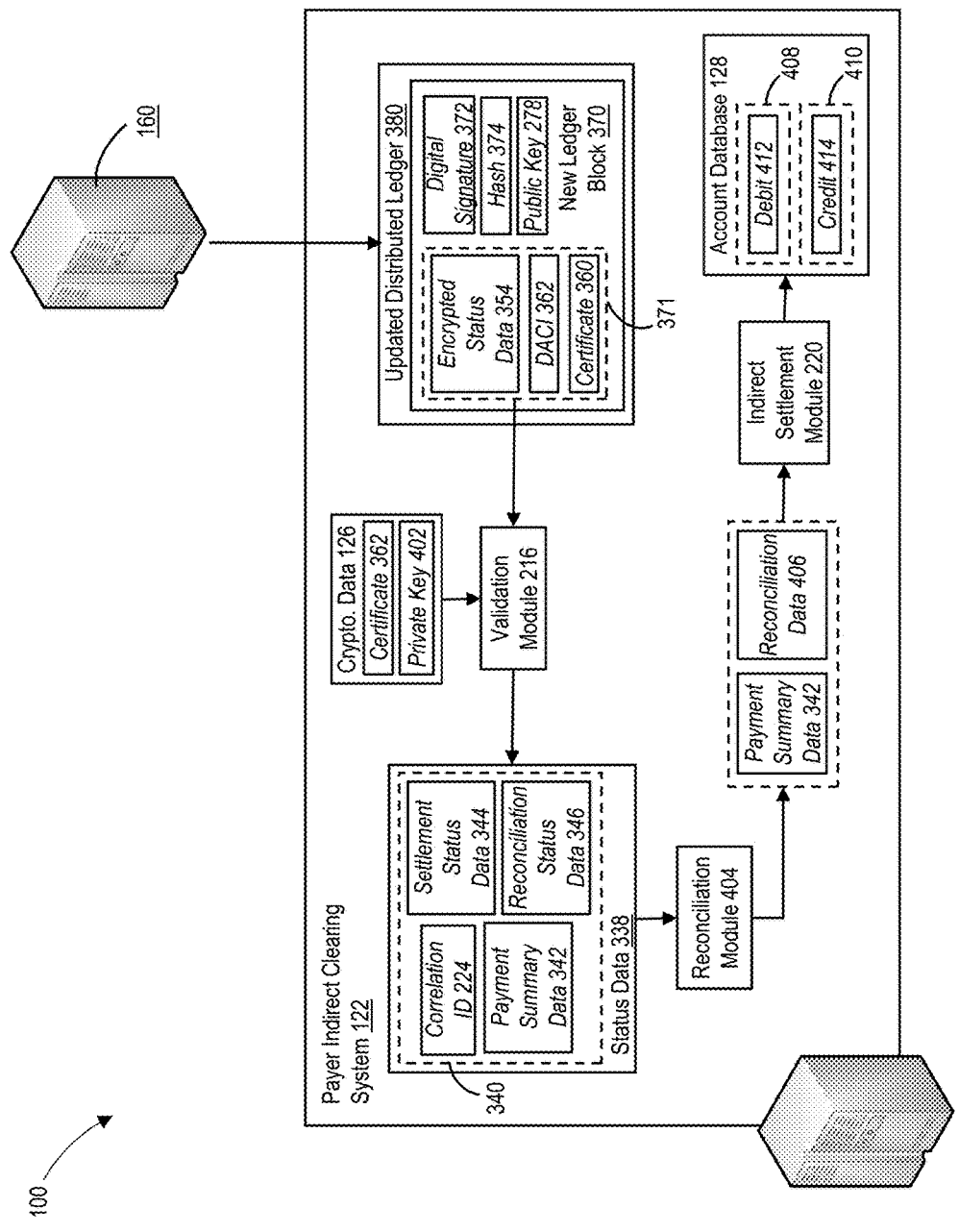

Referring to FIG. 4, payer indirect clearing system 122 may receive updated distributed ledger 380, which includes ledger blocks 370 and 272, and may perform operations that store updated distributed ledger 380 within a corresponding portion of data repository 124, e.g., to replace prior distributed ledgers 170 and 280. In some instances, and when executed by the one or more processors of payer indirect clearing system 122, validation module 216 may access cryptographic library 126 and extract public key certificate 262 and a corresponding private cryptographic key 402 associated with, or assigned to, payer indirect clearing system 122.

Validation module 216 may access updated distributed ledger 380, and parse each of the ledger blocks to identify one or more of the ledger bocks that record public key certificate 262 (e.g., in additional to any recorded encrypted data or data access control information) and as such, are amenable to decryption and processing by payer indirect clearing system 122. By way of example, and as illustrated in FIG. 4, validation module 216 may determine that ledger block 370 includes public key certificate 262 (and the underlying public cryptographic key), and may access encrypted status data 354 and data access control information 362, along with digital signature 372, hash value 374, and public cryptographic key 278 associated with peer system 162, which generated ledger block 370.

In some instances, validation module 216 may perform operations that verify an integrity of ledger block 370 based on digital signature 372 and hash value 374. By way of example, validation module 216 may perform operations that validate digital signature 372 using public cryptographic key 278, and may further compute a local hash value based on an application of an appropriate hash function to encrypted status data 354, data access control information 362, and digital signature 372. If validation module 216 were unable to validate digital signature 372, or were to detect an inconsistency between hash value 374 and the locally computed hash value, validation module 216 may decline to verify the integrity of ledger block 272, and may await a receipt of an additional version of the distributed ledger from one of peer systems 160.

Alternatively, and in response to a validation of digital signature 372 and a determined consistency between hash value 374 and the locally computed hash value, validation module 216 may verify the integrity of ledger block 370, and may perform additional operations that verify an integrity of encrypted status data 354 based on portions of data access control information 362. For example, validation module 216 may obtain public key certificate 358 of payer direct clearing system 142 from data access control information 362, and further, may extract the public cryptographic key of payer direct clearing system 142 from public key certificate 358. In some instances, validation module 216 may perform operations that validate digital signature 356, e.g., as included within data access control information 362, using the extracted public key certificate of payer direct clearing system 142.

If validation module 216 were unable to validate digital signature 356, validation module 216 may decline to verify the integrity of encrypted status data 354, and may await a receipt of an additional version of the distributed ledger from one of peer systems 160. Alternatively, in response to a successful validation of digital signature 356, validation module 216 may verify the integrity of encrypted status data 354, and may perform operations that decrypt all or a portion of encrypted status data 354 using private cryptographic key 402, and provide decrypted summary data, e.g., status data 338 of FIG. 3B, as an input to a reconciliation module 404 of executed transaction engine 214.

As described herein, each element of status data 338 is associated with, and corresponds to, one of the payment transactions submitted by payer indirect clearing system 122, and cleared and settled by payer direct clearing system 142 using any of the exemplary processes described herein. For example, status data 338 may include an element 340 that identifies and characterizes the particular payment transaction involving the outstanding invoice for $7,500.00, and element 340 may include, among other things: correlation identifier 224; payment summary data 342 (e.g., that includes transaction parameter values extracted from correlated transaction data 222); settlement status data 344 (e.g., that includes information characterizing a successful settlement of the payment transaction and transfer of the $7,500.00 to the destination account of the merchant, as extracted from settlement report 330); and reconciliation status data 346 (e.g., that includes information characterizing a successful reconciliation of the $7,500.00 payment against the balance available within the settlement account of payer indirect clearing system 122, as extracted from reconciliation data 322). Further, although not depicted in FIG. 4, status data 338 may include additional data elements that characterize each of the submitted additional payment transactions.

Reconciliation module 404 may also perform operations that access transaction database 130 (e.g., as maintained within data repository 124), and obtain elements of correlated transaction data 222 that identify and characterize each of the initiated payment transactions submitted to payer direct clearing system 142. In other instances, not illustrated in FIG. 4, reconciliation module may access pointer data maintained within transaction database 130, and obtain the elements of correlated transaction data 222 from a file location within one or more cloud-based data repositories associated with the accessed pointer data.

For example, element 226 of correlated transaction data 222 may identify and characterize the payment transaction involving the outstanding invoice for $7,500.00, and may include correlation identifier 224 and transaction data element 206 (e.g., that includes payment instruction information 208 and rich transaction remittance data 210). Although not depicted in FIG. 4, correlated transaction data 222 may include additional data elements that characterize each of the additional payment transactions submitted by payer indirect clearing system 122, and cleared and settled by payer direct clearing system 142 using any of the exemplary processes described herein.

In some instances, reconciliation module 404 may perform operations that reconcile each of the payment transactions based on corresponding elements of status data 338 and correlated transaction data 222. By way of example, and for the particular payment transaction involving the outstanding invoice for $7,500.00, reconciliation module 404 may parse element 340 of status data 338 to confirm that payer direct clearing system 142 successfully cleared and settled the particular payment transaction for an amount (e.g., $7,500.00) consistent with payment instruction information 208, and that the one or more transaction processing networks successfully transferred the $7,500.00 to the account of the merchant, e.g., payment instruction information 208.

Reconciliation module 404 may generate an element 406 of reconciliation data indicative of the successful and completed settlement of the particular payment transaction, and associate reconciliation data element 406 with element 226 of correlated transaction data 222 within transaction database 130 (not illustrated in FIG. 4). In some instances, reconciliation module may also provide payment summary data 342 and reconciliation data element 406 as inputs to indirect settlement module 220 of executed transaction engine 214, which may access account database 128, and identify a data record 408 that characterizes the financial services account of the payer (i.e., the source account specified within payment summary data 342), and a data record 410 identifying a settlement account associated payer indirect clearing system 122, which funds indirect settlement processing by payer direct clearing system 142.

As illustrated in FIG. 4, indirect settlement module 220 may perform operations that modify data record 408 to include debit data 412 indicative of a debit of $7,500.00 for the financial services account of payer 103, and that modify data record 410 to include credit data 414 indicative of a credit of $7,500.00 for the settlement account, which may be swept and transferred to the direct participant that operates payer direct clearing system 142. Further, although not illustrated in FIG. 4, indirect settlement module 220 may perform any of these exemplary processes to reconcile each of the additional payment transactions submitted to payer direct clearing system 142 based on corresponding pairs of elements of status data 338 and correlated transaction data 222.

In some exemplary embodiments, as described herein, one or more computing systems associated with payer 103, such as, but not limited to, payer indirect clearing system 122 and payer direct clearing system 142, may participate in a permissioned, distributed-ledger network, e.g., one or more of peer systems 160. Through any of the exemplary consensus-based processes described herein, payer direct clearing system 142 may immutably record, within one or more ledger blocks of a permissioned distributed ledger, encrypted status data characterizing a reconciliation and settlement status of one or more payment transactions submitted by for settlement and clearance by payer indirect clearing system 122. As a participant in the permissioned distributed-ledger network, payer indirect clearing system 122 may be configured to access the permissioned distributed ledger, and based on a selective decryption of that encrypted status data, payer indirect clearing system 122 may perform any of the exemplary processes described herein to reconcile each of the submitted payment transactions without the temporal delay and resulting increased potential for fraudulent activity that characterizes many conventional indirect settlement protocols that leverage existing payment rails.

The disclosed exemplary embodiments are, however, not limited to permissioned, distributed-ledger networks that include direct and indirect clearing systems operated by or associated with payer 103 or the payer financial institution. For example, and as described herein, payer indirect clearing system 122 may submit, within settlement request 228, an element of correlated transaction data 222 that characterizes the particular payment transaction that satisfies an outstanding $7,500.00 invoice issued by a merchant. The element of correlated transaction data 222 may identify, among other things, a destination account associated with the payment transaction, which may correspond to a deposit account held by a merchant at a corresponding financial institution, e.g., a "payee" financial institution. In some instances, the payee financial institution may also represent an indirect participant in the one or more transaction processing networks described herein, and as an indirect participant in these transaction processing networks, the payee financial institution relies on an additional, direct participant to generate and broadcast reporting data characterizing the clearance and settlement of the particular payment transaction prior to transferring funds into the deposit account held by the merchant.

As described below in reference to FIG. 5, the permissioned, distributed-ledger network may also include one or more additional participants associated with the merchant or the payee financial institution, such as, but not limited to, a payee indirect clearing system 522 and a payee direct clearing system 542. By way of example, and as described below in reference to FIGS. 6A and 6B, payee direct clearing system 542 may receive settlement report data that identifies and characterizes one or more payment transactions settled by the one or more transaction processing networks, e.g., based on data exchanged with transaction processing system 112. At least a portion of these settled payment transactions involve transfers of funds to an account maintained by the payee financial institution, and in some instances, payee direct clearing system 542 may perform operations that record certain selectively encrypted elements of payment summary, reconciliation, and/or status data that characterize the portion of the settled payment transactions within a cryptographically secure and permissioned, distributed ledger accessible to payee indirect clearing system 522.

In some instances, and as a participant in the permissioned, distributed-ledger network, payee indirect clearing system 522 may access the permissioned distributed ledger and decrypt the selectively encrypted elements of the payment summary, reconciliation, and/or status data (e.g., using a corresponding private key). Further, and based on the decrypted elements of the payment summary, reconciliation, and/or status data, payee indirect clearing system 522 may perform operations that reconcile each of these payment transactions, and credit funds to the associated deposit or financial services accounts, in real-time and without the delays associated with conventional transaction processing networks and the increased potential for fraudulent activity associated with these delays.

Figure 5:
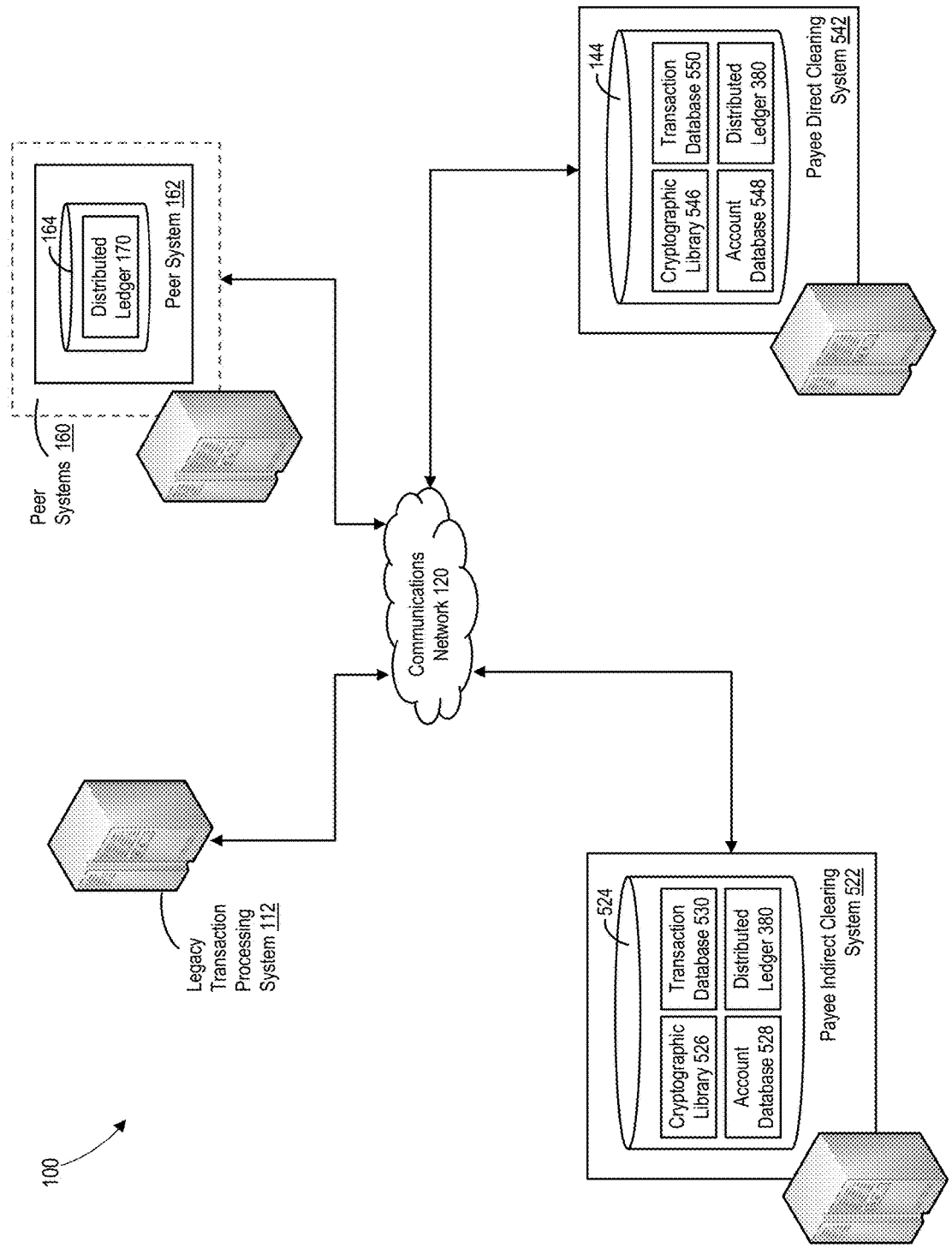

Referring to FIG. 5, an additional portion of exemplary computing environment 100 may include one or more computing systems associated with a transaction processing network, such as transaction processing system 112, payee indirect clearing system 522, payee direct clearing system 542, and one or more peer systems 160, such as peer system 162. Further, each of transaction processing system 112, payee indirect clearing system 522, payee direct clearing system 542, and peer systems 160, including peer system 162, may be interconnected through any combination of communications networks, such as network 120.

As described above for transaction processing system 112 and peer systems 162, each of payee indirect clearing system 522 and payee direct clearing system 542 may represent a computing system that includes one or more servers (e.g., one or more processors) and tangible, non-transitory memory devices storing executable code and application modules. The servers may each include one or more processor-based computing devices, which may be configured to execute portions of the stored code or application modules to perform operations consistent with the disclosed embodiments, including operations consistent with the exemplary process described herein that manage, monitor, and reconcile initiated exchanges of data using cryptographically secure and permissioned distributed ledgers. Further, in some examples, each of payee indirect clearing system 522 and payee direct clearing system 542 may each include a communications interface coupled to the one or more processors for accommodating wired or wireless communication across network 120 with any of the additional network-connected systems or devices described, e.g., a transceiver device. In other instances, one or more of payee indirect clearing system 522 and payee direct clearing system 542 may correspond to a distributed system that includes computing components distributed across one or more networks, such as network 120, or other networks, such as those provided or maintained by cloud-service providers. Further, one or more of payee indirect clearing system 522 and payee direct clearing system 542 can be incorporated into a single computing system, as described herein.

To facilitate a performance of one or more of the exemplary processes described herein, payee indirect clearing system 522 may maintain, within the one or more tangible, non-transitory memories, a data repository 524 that includes, but is not limited to, a cryptographic library 526, an account database 528, and a transaction database 530. In some instances, cryptographic library 526 may include an asymmetric cryptographic key pair associated with, generated by, or assigned to payee indirect clearing system 522 (e.g., a private cryptographic key and a corresponding public cryptographic key), along with public key certificates associated with one or more additional computing systems within environment 100, such as, but not limited to, payee direct clearing system 542 or other computing systems associated with or operated by a financial institution associated with one or more payees involved in corresponding payment transactions.

Account database 528 may include structured or unstructured data records that identify and characterize one or more financial services accounts issued by the payer financial institution to the merchant and other customers, and in some instances, transaction database 530 may include structured or unstructured data records that identify and characterize payment transactions involving the financial services accounts held by merchant and other customers. Further, data repository 524 may also include a local copy of a latest, longest version of a permissioned distributed ledger, such as, but not limited to, updated distributed ledger 380 that includes ledger blocks 272 and 370.

Further, and to facilitate a performance of these exemplary processes, payee direct clearing system 542 may maintain, within the one or more tangible, non-transitory memories, a data repository 544 that includes, but is not limited to, a cryptographic library 546, an account database 548, and a transaction database 550. In some instances, cryptographic library 546 may include an asymmetric cryptographic key pair associated with, generated by, or assigned to payee direct clearing system 542 (e.g., a private cryptographic key and a corresponding public cryptographic key), along with public key certificates associated with one or more additional computing systems within environment 100, such as, but not limited to, payee indirect clearing system 522 or other computing systems associated with or operated by a financial institution associated with one or more payees involved in corresponding payment transactions.

Account database 548 may include structured or unstructured data records that identify and characterize one or more financial services accounts issued to one or more customers of payee direct clearing system 542, such as a direct settlement account of payee direct clearing system 542 and an indirect settlement account maintained on behalf of payee indirect clearing system 522. Further, transaction database 550 may include structured or unstructured data records that identify and characterize one or more exchanges of data (e.g., payment transactions) submitted for settlement and clearance using any of the exemplary processes described herein, or additional exchanges of data settled and cleared using any of the exemplary processes described herein, e.g., portions of payment data routed from payee indirect clearing system 522 to payee direct clearing system 522. Data repository 544 may also include a local copy of a latest, longest version of a permissioned distributed ledger, such as updated distributed ledger 380 that includes ledger blocks 272 and 370.

Figure 6A:
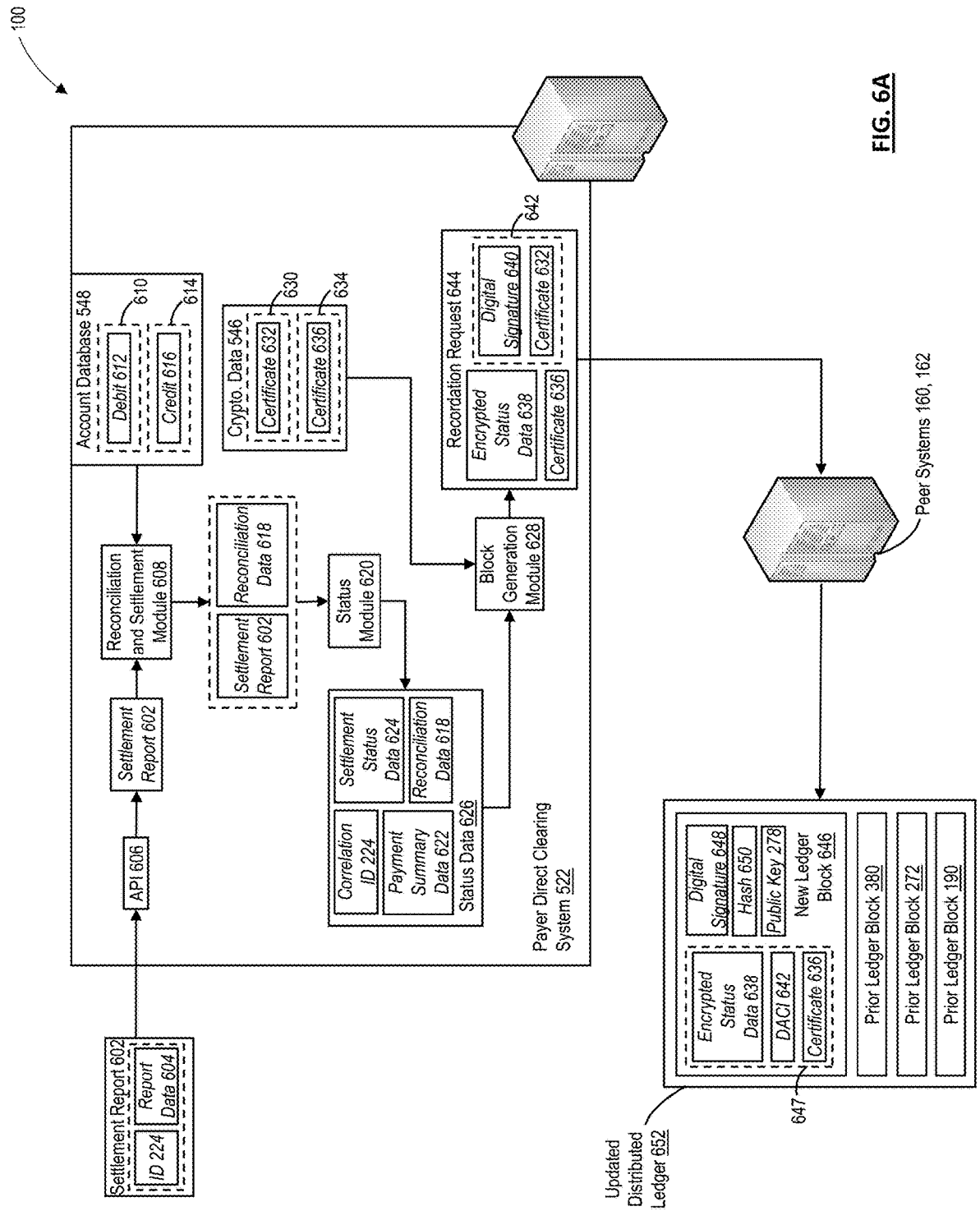

Referring to FIG. 6A, and through an implementation of any of the exemplary transaction settlement processes described herein, transaction processing system 112 may generate settlement report 602 that identifies one or more settled payment transactions involving accounts maintained by payee direct clearing system 542 on behalf of various customers, such as, but not limited to, a settlement account associated with the payee financial institution. In some instances, each element of settlement report 602 may correspond to a respective one of the settled payment transactions, and may include a unique identifier assigned to that respective payment transaction, along with status data characterizing a status of the respective payment transaction during the settlement process (e.g., successfully settled, rejected, etc.). In other instances, settlement report 602 may specify that one or more subsets of the payment transactions were aggregated or "netted" prior to settlement.

For example, and for the particular payment transaction associated with the outstanding $7,500.00 invoice from payer 103 to the merchant, settlement report 602 may include correlation identifier 224 and report data 604 indicative of the successful settlement of the payment transaction and the transfer of the $7,500.00 from the settlement account of payer indirect clearing system 122 (e.g., as maintained by payer direct clearing system 142 of FIG. 1) to the indirect settlement account of payee indirect clearing system 522 (e.g., as maintained by payee direct clearing system 542). In some instances, transaction processing system 112 may perform operations that transmit settlement report 602 across network 120 to payee direct clearing system 542, e.g., via a secure programmatic interface, such as an API 606. As illustrated in FIG. 6A, API 606 may receive and route settlement report 602 to a reconciliation and settlement module 608, which upon execution by the one or more processors of payee direct clearing system 542, performs reconciliation processing based on locally maintained elements of account data and portions of settlement report 602.

By way of example, and based on portions of settlement report 602, reconciliation and settlement module 608 may perform operations that confirm a successful (or alternatively, unsuccessful) settlement of each of the payment transaction associated with the outstanding $7,500.00 invoice. In some instances, and respective to a successful settlement, reconciliation and settlement module 608 may access account database 548, and identify one or more data records that include account data 610 characterizing, among other things, a current balance of the direct settlement account of payee direct clearing system 542, which collects settled funds prior to disbursement to various specified destination accounts. Based on a determination that current balance of the direct settlement account exceeds $7,500.00 (e.g., the transaction amount of the settled transaction), reconciliation and settlement module 608 may modify a portion of account data 610 to include a debit 612 indicative of the settled payment transaction that satisfies the outstanding $7,500.00 invoice.

Further, reconciliation and settlement module 608 may also access one or more additional data records of account database 548, and identify additional account data 614 that characterizes an account balance of the indirect settlement account of payee indirect clearing system 522, which collects funds derived from payment transactions settled by payee direct clearing system 542 on behalf of payee indirect clearing system 522. Reconciliation and settlement module 608 may perform operations that modify a portion of account data 614 to include a credit 616 indicative of the settled payment transaction that satisfies the outstanding $7,500.00 invoice. Additionally, in some instances, reconciliation and settlement module 608 generate one or more elements of reconciliation data 618, which characterize the exemplary reconciliation processes described herein, and specify that the $7,500.00 associated with the settled payment transaction identified in settlement report 602 is ready for transfer to the destination account at payee indirect clearing system 522.

In some instances, illustrated in FIG. 6A, reconciliation and settlement module 608 may perform operations that store correlation identifier 224 and report data 604, which identify and characterize the now-settled payment transaction involving the $7,500.00 invoice, within one or more data records of transaction database 550, along with the generated elements of reconciliation data 618 (not illustrated in FIG. 6A). In other instances, reconciliation and settlement module 608 may perform operations that store portions of correlation identifier 224, report data 604, and reconciliation data 618 within one or more of the cloud-based data repositories described herein, and maintain pointer data indicative of the corresponding file locations within the one or more data records of transaction database 550.

Further, reconciliation and settlement module 608 may also provide settlement report 602 and reconciliation data 618 as inputs to a status module 620, which, when executed by the one or more processors of payee direct clearing system 542, generates elements of status data 626 summarizing the settled payment transaction (e.g., the payment transaction involving the $7,500.00 invoice) and elements of data characterizing the settlement and reconciliation status of that payment transaction. For example, status module 620 may parse settlement report 602, and extract correlation identifier 224 and report data 604. Based on a portion of report data 604, transaction summary module 620 may generate elements of payment summary data 622 that specifies values of parameters that characterize the now-settled payment transaction (e.g., a transaction value of $7,500.00, an identifier of the merchant or the destination account of the merchant, etc.) and settlement status data 624 that characterizes the successful settlement of the payment transaction. As illustrated in FIG. 6A, status module 620 may package correlation identifier 224, payment summary data 622, settlement status data 624, and reconciliation data 618 into corresponding portions of status data 626.

In some instances, payment summary data 622 may be structured as a corresponding payment instruction characterized by a standard, data-interchange format, such as the ISO 20022™ standard data-interchange format described herein. Further, although not illustrated in FIG. 6A, status module 620 may perform any of the exemplary processes described herein to generate discrete portions of summary data for additional, or alternate, payment transactions settled by transaction processing system 112 and specified within settlement report 602.

Status module 620 may provide summary data 626 as an input to a block generation module 628, which may be executed by the one or more processors of payee direct clearing system 542. In some instances, and upon receipt of summary data 626, executed block generation module 628 may access cryptographic library 546, e.g., as maintained within data repository 544, and extract, from cryptographic library 546: (i) cryptographic data 630 that includes a private cryptographic key associated with payee direct clearing system 542 and a public key certificate 632 of payee direct clearing system 542, which includes a corresponding public cryptographic key; and (ii) cryptographic data 634 that includes a public key certificate 636 of payee indirect clearing system 522, which includes a corresponding public cryptographic key. In some instances, each of the public key certificates may be generated by a corresponding certificate authority operating within environment 100, e.g., a certificate authority associated with the permissioned distributed-ledger network described herein.

Block generation module 628 may perform operations that encrypt each of the elements of summary data 626 using the public cryptographic key of payer indirect clearing system 522 (e.g., as extracted from public key certificate 636), and may generate corresponding elements of encrypted status data 638. In some instances, block generation module 628 may apply a digital signature 640 to the elements of encrypted status data 638 based on the private cryptographic key of payer direct clearing system 542 (e.g., as extracted from cryptographic data 630). Further, and as illustrated in FIG. 6A, block generation module 628 may package encrypted status data 638, digital signature 640, public key certificate 632 of payee direct clearing system 142, and public key certificate 636 of payee indirect clearing system 522 into corresponding portions of a recordation request 644.

In some instances, digital signature 640 and public key certificate 632 may collectively represent data access control information 642 that enables one or more computing systems within environment 100, such as payee indirect clearing system 522, to establish an integrity and authenticity of encrypted status data 638. Further, the inclusion of public key certificate 636 within recordation request 644 may enable payee indirect clearing system 522 to identify encrypted data capable of decryption using a corresponding private cryptographic key. As illustrated in FIG. 6A, block generation module 628 may perform operations that cause payee direct clearing system 542 to broadcast recordation request 644 across network 120 to each of peer systems 160, including peer system 162.

By way of example, peer system 162 may perform any of the exemplary, consensus-based processes described herein to validate recordation request 644 and to package all, or a portion, of recordation request 644 into a new ledger block 646. Through the implementation of one or more of the consensus-based processes described herein, peer system 162 may generate a latest, longest version of the permissioned distributed ledger, e.g., an update to distributed ledger 380, that includes the newly generated ledger blocks, and broadcast the updated distributed ledger to payee indirect clearing system 522, payee direct clearing system 542, additional ones of peer system 160, and to other computing systems and devices that participate in the permissioned distributed-ledger network operating within environment 100.

For example, as illustrated in FIG. 6A, peer system 162 may generate an updated distributed ledger 652 that include new ledger block 646 appended to one or more prior ledger blocks, such as prior ledger blocks 370 and 272. A payload portion 647 of new ledger block 646 may include, among other things, encrypted status data 638, data access control information 642 (e.g., which itself includes digital signature 640 and public key certificate 632 of payee direct clearing system 542), and public key certificate 636 of payer indirect clearing system 522. New ledger block 370 may also include a digital signature 648 applied to payload 647, e.g., using a corresponding private cryptographic key of peer system 162, and a hash value 650 computed based on an application of any appropriate hash algorithm to payload 647 and digital signature 648, either alone or in conjunction with a corresponding public cryptographic key 278 of peer system 162.

In some instances, and as described herein, the elements of payment summary data, settlement status data, and reconciliation status data that characterize each of payment transactions within new ledger block 646, and within updated distributed ledger 652, may include actual values of corresponding transaction parameters (e.g., within the payment summary data), actual status data characterizing the position the payment transaction within the indirect settlement processes described herein (e.g., within the settlement status data), or actual reconciliation data characterizing an outcome of the reconciliation process for the payment transaction (e.g., within the reconciliation status data). In other instances, and consistent with the disclosed exemplary embodiments, one or more of these elements of payment summary data, settlement status data, and reconciliation status data may instead include pointer data that identifies a storage location of an appropriate data element within a cloud-based repository to accessible to payee indirect clearing system 522 and payee direct clearing system 542.

Figure 6B:
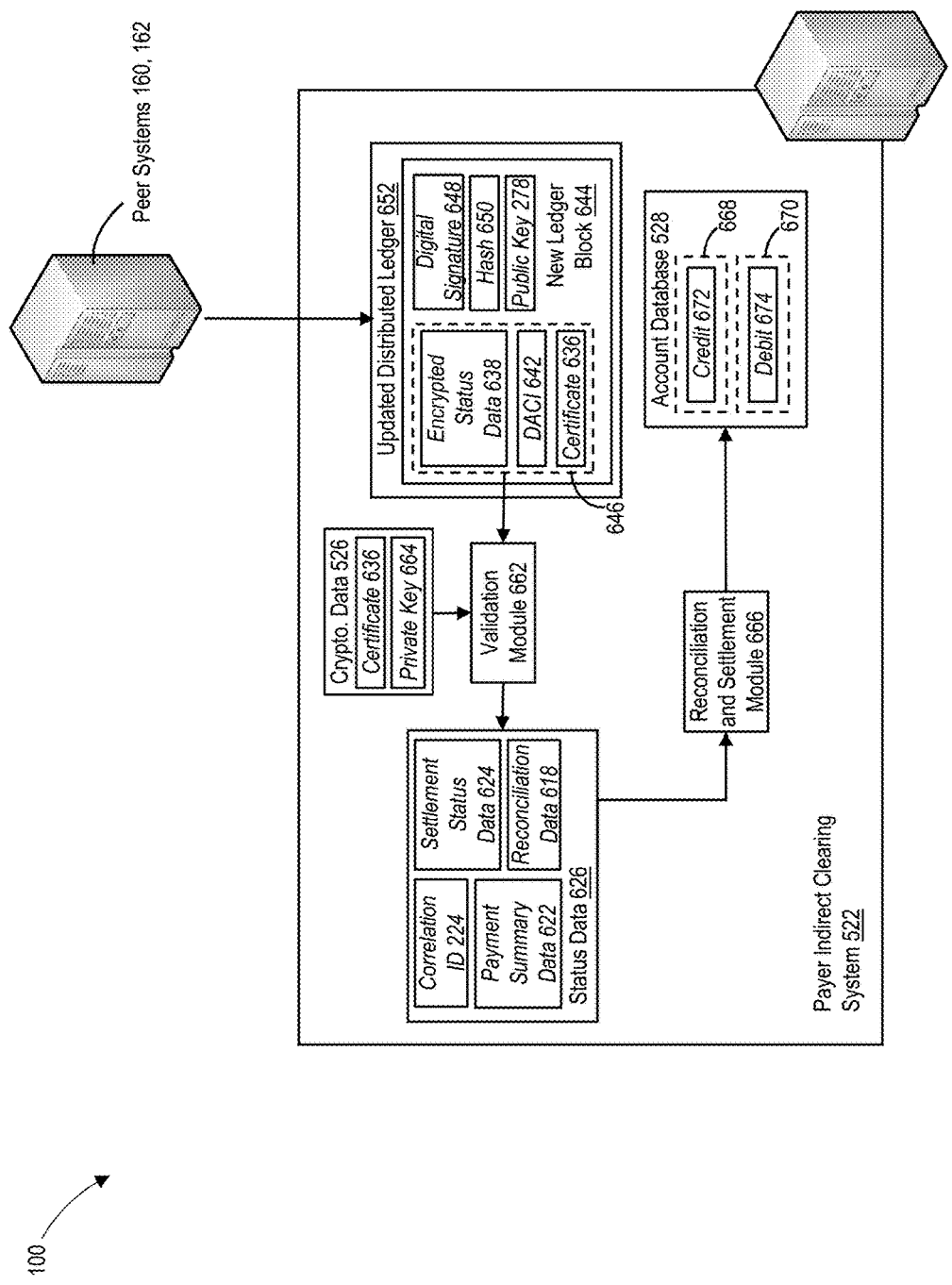

Referring to FIG. 6B, payee indirect clearing system 522 may receive updated distributed ledger 652, which includes ledger blocks 646, 370, and 272, and may perform operations that store updated distributed ledger 652 within a corresponding portion of data repository 524, e.g., to replace prior distributed ledgers 170, 280 and/or 380. In some instances, and when executed by the one or more processors of payee indirect clearing system 522, a validation module 662 may access cryptographic library 526 and extract public key certificate 636 and a corresponding private cryptographic key 664 associated with, or assigned to, payee indirect clearing system 522.

Validation module 662 may access updated distributed ledger 652, and parse each of the ledger blocks to identify one or more of the ledger bocks that record public key certificate 636 (e.g., in additional to any recorded encrypted data or data access control information) and as such, are amenable to decryption and processing by payee indirect clearing system 522. By way of example, and as illustrated in FIG. 6C, validation module 662 may determine that ledger block 646 includes public key certificate 636 (and the underlying public cryptographic key), and may access encrypted status data 638 and data access control information 642, along with digital signature 648, hash value 650, and public cryptographic key 278 associated with peer system 162, which generated ledger block 646.

In some instances, validation module 662 may perform operations that verify an integrity of ledger block 646 based on digital signature 648 and hash value 650. By way of example, validation module 662 may perform operations that validate digital signature 648 using public cryptographic key 278, and may further compute a local hash value based on an application of an appropriate hash function to encrypted status data 638, data access control information 642, and digital signature 648 (and in some instances, public key certificate 636). If validation module 662 were unable to validate digital signature 648, or were to detect an inconsistency between hash value 650 and the locally computed hash value, validation module 662 may decline to verify the integrity of ledger block 646, and may await a receipt of an additional version of the distributed ledger from one of peer systems 160.

Alternatively, and in response to a validation of digital signature 648 and a determined consistency between hash value 650 and the locally computed hash value, validation module 662 may verify the integrity of ledger block 646, and may perform additional operations that verify an integrity of encrypted status data 638 based on portions of data access control information 642. For example, validation module 662 may obtain public key certificate 632 of payee direct clearing system 542 from data access control information 642, and further, may extract the public cryptographic key of payee direct clearing system 542 from public key certificate 632. In some instances, validation module 662 may perform operations that validate digital signature 640, e.g., as included within data access control information 642, using the extracted public cryptographic key of payer direct clearing system 542.

If validation module 662 were unable to validate digital signature 640, validation module 662 may decline to verify the integrity of encrypted status data 638, and may await a receipt of an additional version of the distributed ledger from one of peer systems 160. Alternatively, in response to a successful validation of digital signature 640, validation module 662 may verify the integrity of encrypted status data 638, and may perform operations that decrypt all or a portion of encrypted status data 638 using private cryptographic key 664 and provide decrypted summary data, e.g., summary data 626 of FIG. 6A, as an input to a reconciliation and settlement module 666 of payee indirect clearing system 522.

As described herein, summary data 626 may be associated with, and corresponds to, a particular one of the payment transactions submitted by payee indirect clearing system 522, and cleared and settled by payee direct clearing system 542 using any of the exemplary processes described herein. For example, status data 626 may identify and characterize the particular payment transaction involving the outstanding invoice for $7,500.00, and may include, among other things, correlation identifier 224, payment summary data 622 (e.g., that includes transaction parameter values extracted from settlement report 602, such as the $7,500.00 transaction amount, an identifier of the destination account, etc.), settlement status data 624 (e.g., that includes information characterizing a successful settlement of the payment transaction and transfer of the $7,500.00 to the destination account of the merchant, as extracted from settlement report 602), and reconciliation data 618 (e.g., that includes information characterizing a successful reconciliation of the $7,500.00 payment against the balance available within the settlement account of payee indirect clearing system 522). Although, not depicted in FIGS. 6A and 6B, status data 626 may include additional data elements that characterize additional payment transactions submitted by payee indirect clearing system 522, and cleared and settled by payee direct clearing system 542 using any of the exemplary processes described herein.

Reconciliation and settlement module 666 may also perform operations that access one or more data records of account database 528, and identify account data 668 that characterizes an account balance of the deposit account held by the merchant, e.g., the destination account specified within payment summary data 622, and account data 670 that characterized an indirect settlement account of payee indirect clearing system 522 that receives proceeds from, or that funds, the indirect settlement processing by payee direct clearing system 542. Reconciliation and settlement module 666 may perform operations that modify a portion of account data 668 to include a credit data 672 indicative of a credit of $7,500.00, which corresponds to the settled payment that satisfies the outstanding $7,500.00 invoice. Further, reconciliation and settlement module 666 may also perform operations that modifies account data 670 to include debit data indicative of a debit of $7,500.00, which facilitates the transfer of funds to the merchant's account.

Figure 7:
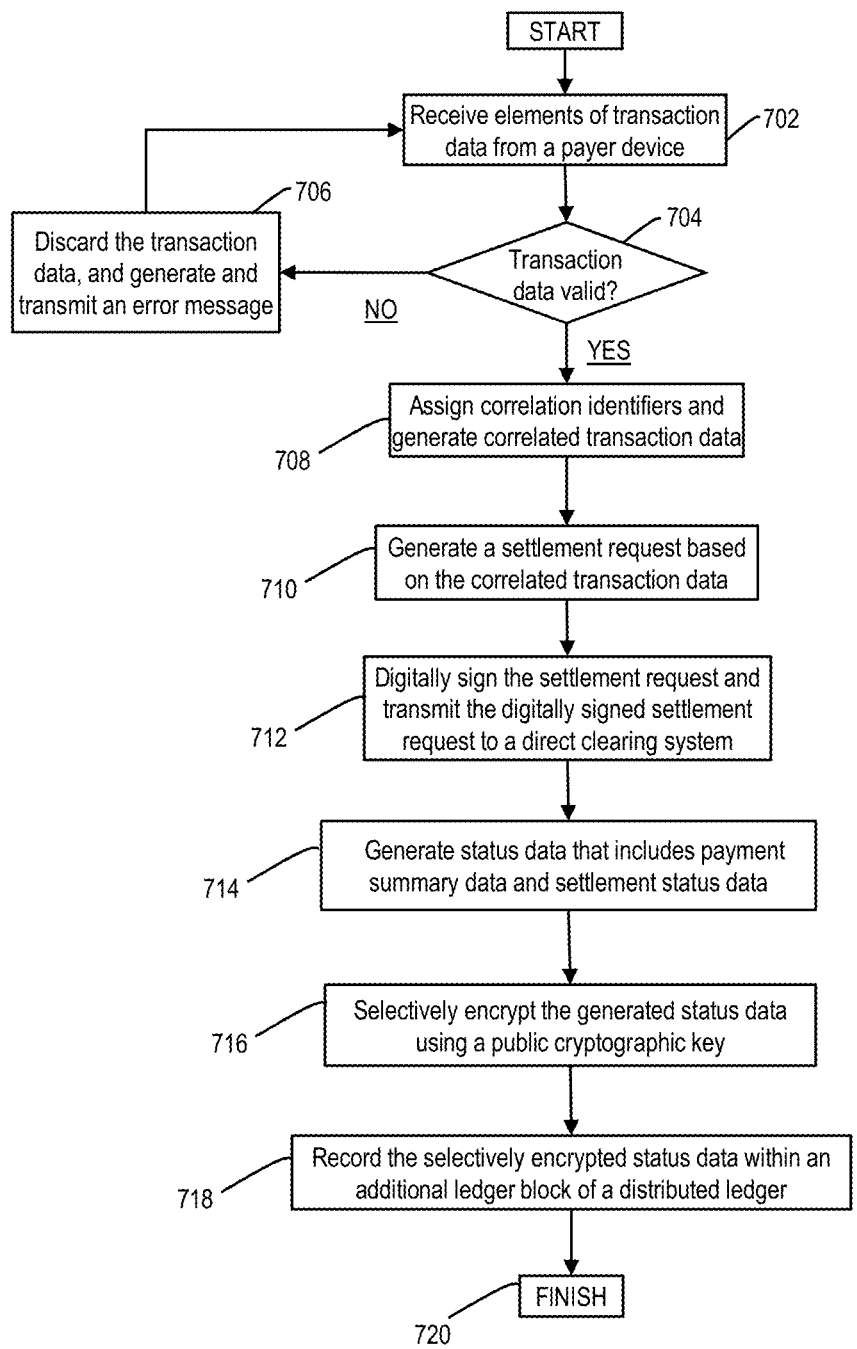
FIGS. 7-9 are flowcharts of exemplary processes for executing and reconciling cryptographically secure exchanges of data using permissioned distributed ledgers, in accordance with the disclosed embodiments.

FIG. 7 is a flowchart of an exemplary process 700 for executing and reconciling cryptographically secure exchanges of data using permissioned distributed ledger, in accordance with the disclosed embodiments. In some instances, one or more network-connected computing systems operating within environment 100, such a payer indirect clearing system 122 may perform the steps of exemplary process 700 that include, among other things, receiving elements of transaction data characterizing discrete transactions initiated at a client device, and based on a validation of the transaction data elements, submitting portions of the transaction data elements to an additional computing system operating within environment 100, such as payer direct clearing system 142, for indirect clearance and settlement, and recording selective encrypted data characterizing a status of the initiated transaction within the indirect clearance and settlement process within one or more ledger blocks of permissioned distributed ledger.

Referring to FIG. 7, payer indirect clearing system 122 may receive transaction data generated by one or more network-connected devices operating within environment 100, such as payer device 102 of FIG. 1 (e.g., in step 702). In some instances, the received transaction data may include elements of transaction data, each of which may identify and characterize a corresponding payment transaction between payer 103 and one or more corresponding counterparties.

As described herein, the discrete elements of transaction data may be generated by an application program executed by one or more processors of payer device 102, e.g., executed payment application 202 of FIG. 2A. Further, executed payment application 202 may package, into corresponding portions of transaction data 204 (e.g., into a header portion, etc.), additional information that, among other things, identifies a payer that operates payer device 102 (e.g., a login credential or digital identifier of payer 103 of FIG. 1), payer device 102 (e.g., an Internet Protocol (IP) address) and/or executed payment application 202 (e.g., an application cryptogram, such as a hash value, random number, cryptographic key, etc.).

In some instances, each of the transaction data elements may be structured in accordance with a standardized data-interchange format, such as the ISO 20022™ standard data-interchange format described herein, and may include payment instruction information specifying parameter values that characterize a corresponding one of the payment transactions and rich transaction remittance data associated with the corresponding payment transaction. Examples of the payment instruction information include, but are not limited to, a transaction type, a transaction value, a transaction date or time, identifiers of the payer and corresponding payee, and identifiers of corresponding payer and payee accounts, and examples of the rich transaction remittance data include, but are not limited to, an electronic copy of one or more pages of the invoice or the packing list, an electronic copy of a corresponding purchase order, or payment advice, as described herein.

Payer indirect clearing system 122 may, for example, perform any of the exemplary processes described herein that validate the received transaction data based on, among other things, the information that identifies payer 103, payer device 102, and additionally, or alternatively, executed application program 202 (e.g., in step 704). If payer indirect clearing system 122 were unable to validate transaction data 204 (e.g., step 704; NO), payer indirect clearing system 122 may perform operations that discard the received transaction data, and that to generate and transmit an error message to payer device 102 (e.g., in step 706). Exemplary process 700 may then pass back to step 702, and payer indirect clearing system 122 may await additional elements of transaction data generated by payer device 102.

Alternatively, if payer indirect clearing system 122 validates the received transaction data (e.g., step 704; YES), payer indirect clearing system 122 may perform any of the exemplary processes described herein to assign a unique alphanumeric identifier, e.g., a correlation identifier, to each element of the validated transaction data (e.g., in step 708). The assigned correlation identifiers may be characterized by a predetermined length or a predetermined structure, and examples of the correlation identifiers include, but are not limited to, a random number or a hash value generated based on portions of corresponding elements of the validated transaction data. In some instances, payer indirect clearing system 122 may perform additional operations that package each element of the validated transaction data and the assigned correlation identifier into an element of correlated transaction data (e.g., also in step 708).

In some instances, payer indirect clearing system 122 may also perform operations that generate a settlement request for submission to a computing system operated by, or associated with, a direct participant in the one or more transaction processing networks described herein, e.g., payer direct clearing system 142 of FIG. 1 (e.g., in step 710). By way of example, and in step 710, payer indirect clearing system 122 may perform any of the exemplary processes described herein to package all or a portion of the correlated transaction data 222 into the settlement request, along with additional information that identifies payer indirect clearing system 122 (e.g., an IP address, a unique digital identifier, such as a cryptogram or hash value, etc.) or one or more financial services accounts maintained on behalf of payer indirect clearing system 122 by payer direct clearing system 142.

Payer indirect clearing system 122 may perform operations that apply a digital signature to the settlement request, e.g., using a private cryptographic key, and may perform operations that transmit the digitally signed settlement request to payer direct clearing system 142 (e.g., in step 712). In some instances, payer direct clearing system 142 may perform any of the exemplary processes described herein to clear and reconcile each of the payment transactions specified within the settlement request, and to submit data characterizing these cleared and reconciled payment transaction to the one or more transaction processing networks, e.g., for settlement in accordance with reconciled transaction parameter values. Further, and as described herein, payer direct clearing system 142 may perform additional consensus-based operations that record selectively encrypted elements of payment summary data, reconciliation status data, and/or settlement status data within one or more ledger blocks of a permissioned distributed ledger, which facilitate an implementation of time-efficient and cryptographically secure process for reconciling the settled payment transactions at payer indirect clearing system 122.

Referring back to FIG. 7, payer indirect clearing system 122 may perform any of the exemplary processes described herein to generate elements of status data characterizing each of the submitted payment transaction (e.g., in step 714). By way of example, and for each of the submitted payment transactions, a corresponding element of the status data may include the assigned correlation identifier (e.g., as extracted from a corresponding element of the correlated transaction data), payment summary data (e.g., derived from payment instructions information and rich transaction remittance data included within the corresponding element of the correlated transaction data), and settlement status data (e.g., specifying that payer indirect clearing system 122 submitted the settlement request to payer direct clearing system 142).

In some instances, payer indirect clearing system 122 may perform operations that selectively encrypt the generated status data, e.g., using a public cryptographic key associated with payer direct clearing system 142 (e.g., in step 716). Further, payer indirect clearing system 122 may perform any of the exemplary processes described herein to record the selected encrypted status data within an additional ledger block of a permissioned, distributed ledger (e.g., in step 718). By way of example, in step 718, payer indirect clearing system 122 may generate a recordation request that includes the selectively encrypted status data, a digital signature applied to the selectively encrypted status data using a private cryptographic key of payer indirect clearing system 122, and a public key certificate of payer indirect clearing system 122. Further, in step 718, payer indirect clearing system 122 may broadcast the recordation request to one or more peer systems within the permissioned, distributed-ledger network, e.g., peer systems 160 of FIG. 1.

Peer systems 160, including peer system 162, may perform any of the exemplary, consensus-based processes described herein to validate the recordation request and to package all, or a portion, of the recordation request into a new ledger block. Through the implementation of one or more of the consensus-based processes described herein, peer systems 160 may generate a latest, longest version of the permissioned distributed ledger that includes the newly generated ledger block, and broadcast the updated distributed ledger to payer indirect clearing system 122, payer direct clearing system 142, additional ones of peer system 160, and to other computing systems and devices that participate in the permissioned distributed-ledger network operating within environment 100, e.g., for storage within a corresponding data repository. Exemplary process 700 is then complete in step 720.

Figure 8:
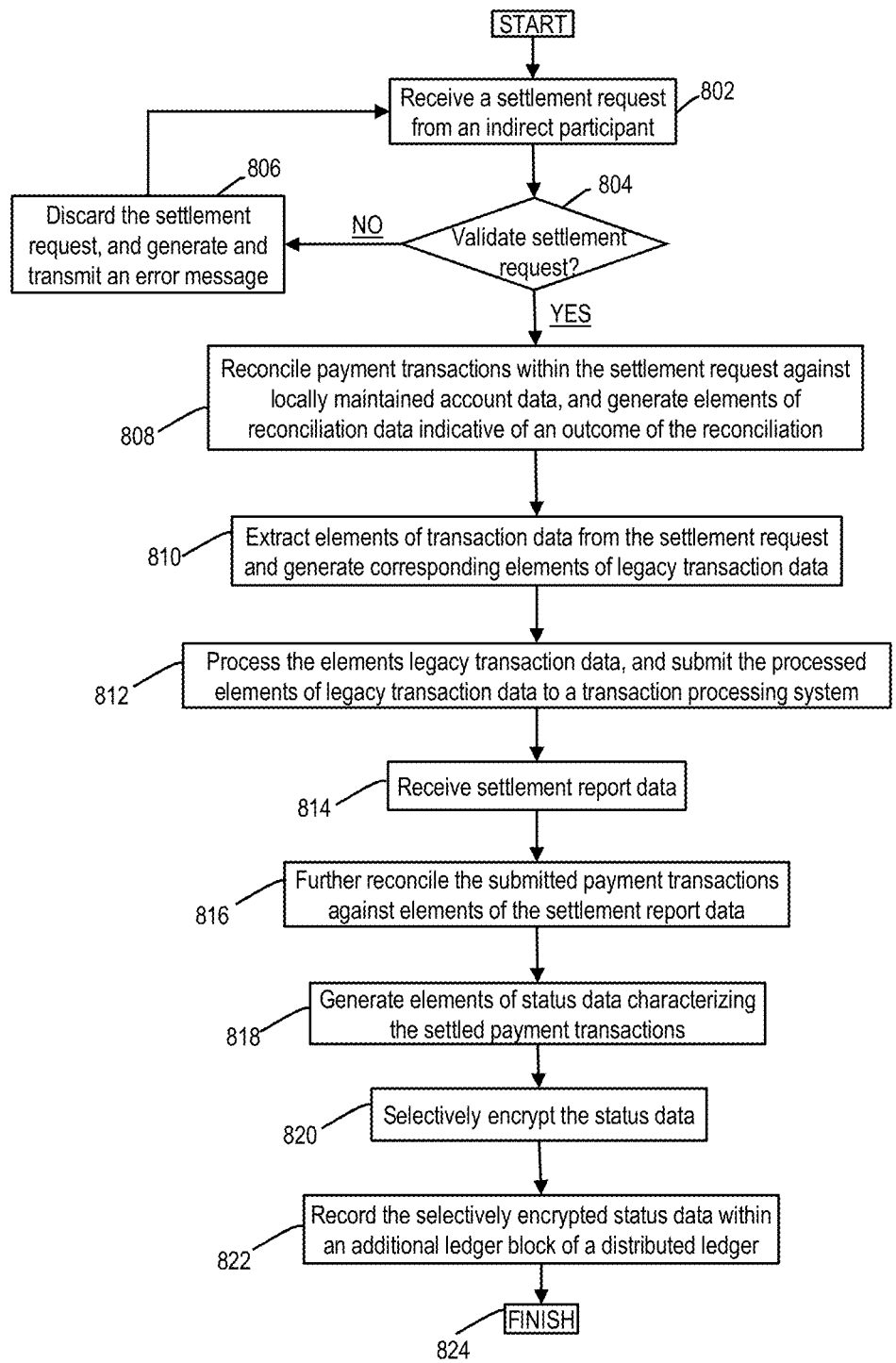

FIG. 8 is a flowchart of an exemplary process 800 for executing and reconciling cryptographically secure exchanges of data using permissioned distributed ledger, in accordance with the disclosed embodiments. In some instances, one or more network-connected computing systems operating within environment 100, such a payer direct clearing system 142 may perform the steps of exemplary process 800, which include, among other things, receive a settlement request from an indirect participant in on one or more transaction processing networks, and based on a validation of the settlement request, perform operations that, on behalf of the indirect participant, clear and reconcile payment transactions specified within the settlement request and submit formatted payment instructions associated with the specified payment transactions to the one or more transaction processing networks for settlement. Further, payer direct clearing system 142 may perform additional steps of exemplary process 800 to record selectively encrypted elements of payment summary data, reconciliation status data, and/or settlement status data within one or more ledger blocks of a permissioned distributed ledger, which facilitates an implementation of time-efficient and cryptographically secure process for reconciling the settled payment transactions at payer indirect clearing system 122.

Referring to FIG. 8, payer direct clearing system 142 may receive a settlement request from a computing system associated with an indirect participant in the one or more transaction processing networks, such as payer indirect clearing system 122 of FIG. 1 (e.g., in step 802). In some instances, and as described herein, the received settlement request may include discrete elements of transaction data that identify and characterize one or more payment transactions initiated at a network-connected device within environment 100, such as payer device 102 of FIG. 1, along with information that that identifies payer indirect clearing system 122 (e.g., an IP address, a cryptogram, etc.), a settlement account of payer indirect clearing system 122 (e.g., an account number, etc.), or an application program executed by payer indirect clearing system 122 (e.g., a cryptogram, etc.).

Payer direct clearing system 142 may, for example, perform any of the exemplary processes described herein to validate the received settlement request based on, among other things, the information that identifies payer indirect clearing system 122, the settlement account, or the executed application program (e.g., in step 704). If payer direct clearing system 142 were unable to validate the settlement request (e.g., step 804; NO), payer direct clearing system 142 may discard the settlement request, and may perform operations that generate and transmit an error message (e.g., in step 806). Exemplary method 800 may then pass back to step 802, and payer direct clearing system 142 may await additional settlement requests generated by payer indirect clearing system 122 and computing systems operated by other indirect participants in the one or more transaction processing networks.

Alternatively, if payer direct clearing system 142 were to validate the settlement request (step 804; YES), payer direct clearing system 142 may perform operations that reconcile the payment transactions specified within the settlement requests to against corresponding elements of locally maintained account data (e.g., in step 808). By way of example, and in step 808, payer direct clearing system 142 may perform any of the exemplary processes described herein to verify an available balance in a settlement account of payer indirect clearing system 122 is equivalent to, or exceeds, an aggregated transaction value of the payment transactions submitted for settlement by payer indirect transaction system 122, e.g., as specified within the settlement request. Further, in step 808, payer direct clearing system 142 may also perform operations that generate, and store within the one or more tangible, non-transitory memories, elements of reconciliation data that, for example, identify the available balance of the settlement account and/or the aggregate value of the initiated payment transactions, and confirm that the available balance of the settlement account is sufficient to fund the initiated payment transactions.

Payer direct clearing system 142 may also extract, from the settlement request, the transaction data elements identifying and characterizing each of the payment transactions, and may perform any of the exemplary processes described herein to process each of the extracted elements and generate a corresponding element of legacy transaction data (e.g., in step 810).

Payer direct clearing system 142 may submit the processed elements of legacy transaction data to a computing system associated with, or operated by, the one or more transaction processing networks, e.g., transaction processing system 112 of FIG. 1, for settlement (e.g., in step 812). As described herein, and during the settlement process, legacy transaction processing system 112 may generate elements of a settlement report that identify each of the payment transaction submitted for settlement (e.g., via a corresponding one of the correlation identifiers) and a status of the payment transaction during the settlement process (e.g., successfully settled, rejected, etc.). In some instances, legacy transaction processing system 112 may perform operations that transmit the settlement report across network 120 to payer direct clearing system 142, which may receive the settlement report data in step 814.

In some instances, payer direct clearing system 142 may perform any of the exemplary processes described herein to further reconcile the submitted payment transaction against corresponding elements of the settlement report data, and to update the generated reconciliation data based on an outcome of these further reconciliation processes (e.g., in step 816). By way of example, and based on portions of the settlement report, payer direct clearing system 142 may perform operations that confirm a successful (or alternatively, unsuccessful) settlement of each of the initiated payment transaction submitted to transaction processing system 112, and confirm that an aggregated transaction value of the settled transactions corresponds to the aggregated transaction value of the initiated payment transactions submitted for settlement (e.g., as debited from the settlement account of payer indirect clearing system 122). In an event that payer direct clearing system 142 were to detect an unsuccessfully settled one of the submitted payment transactions, or an inconsistency between the submitted and settled payment transactions, direct clearing system 142 may modify the generated reconciliation data to reflect the detected inconsistency (e.g., also in step 816).

Payer indirect clearing system 122 may perform any of the exemplary processes described herein to generate discrete elements of status data that characterize each of the settled payment transactions and further, a reconciliation and a settlement status of each of the submitted payment transactions (e.g., in step 818). By way of example, and for a corresponding one of the submitted payment transactions: a corresponding element of the status data may include the assigned correlation identifier (e.g., as extracted from a corresponding element of the extracted transaction data); payment summary data (e.g., that summarizes the corresponding payment transaction, as derived from payment instructions information and rich transaction remittance data included within the corresponding element of the extracted transaction data); settlement status data (e.g., that characterizes a settlement status of the corresponding payment transaction); and reconciliation status data (e.g., that identifies an outcome of the reconciliation process for the corresponding payment transaction).

In some instances, payer direct clearing system 142 may perform operations that selectively encrypt the generated status data, e.g., using a public cryptographic key associated with payer indirect clearing system 122 (e.g., in step 820). Further, payer direct clearing system 142 may perform any of the exemplary processes described herein to record the selectively encrypted status data within an additional ledger block of a permissioned, distributed ledger (e.g., in step 720). By way of example, in step 720, payer direct clearing system 142 may generate a recordation request that includes the selectively encrypted status data, elements of digital access control information (e.g., a public key certificate of payer direct clearing system 142 and a digital signature applied to the selectively encrypted status data using a private cryptographic key of payer direct clearing system 142), and a public key certificate of payer indirect clearing system 122. Further, in step 822, payer indirect clearing system 122 may broadcast the recordation request to one or more peer systems within the permissioned, distributed-ledger network, e.g., peer systems 160 of FIG. 1.

Peer systems 160, including peer system 162, may perform any of the exemplary, consensus-based processes described herein to validate the recordation request and to package all, or a portion, of the recordation request into a new ledger block. Through the implementation of one or more of the consensus-based processes described herein, peer systems 160 may generate a latest, longest version of the permissioned distributed ledger that includes the newly generated ledger block, and broadcast the updated distributed ledger to payer indirect clearing system 122, payer direct clearing system 142, additional ones of peer system 160, and to other computing systems and devices that participate in the permissioned distributed-ledger network operating within environment 100, e.g., for storage within a corresponding data repository. Exemplary process 800 is then complete in step 824.

Figure 9:
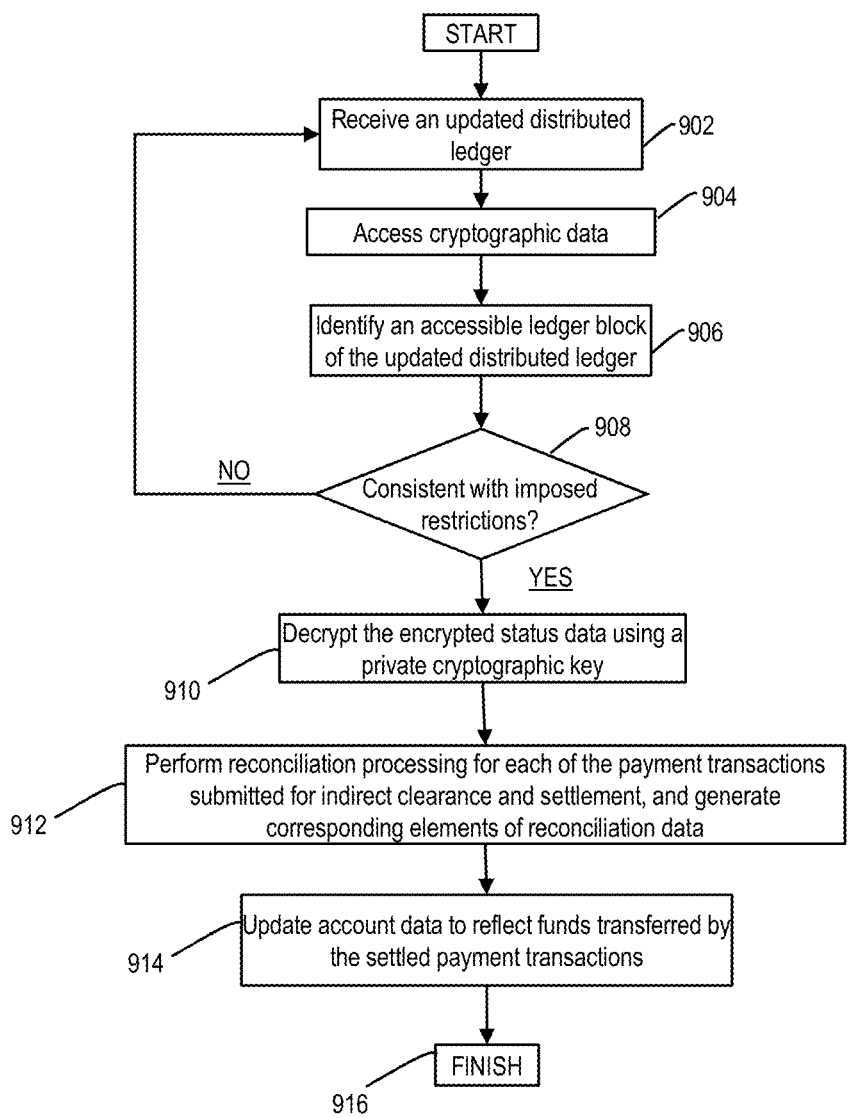

FIG. 9 is a flowchart of an exemplary process 900 for reconciling cryptographically secure exchanges of data using permissioned distributed ledgers, in accordance with the disclosed embodiments. In some instances, one or more network-connected computing systems operating within environment 100, such a payer indirect clearing system 122 may perform the steps of exemplary process 900 that include, among other things, receiving an updated distributed ledger that records summary data characterizing a clearance, reconciliation, or settlement status of one or more payment transactions, reconciling the one or more payment transactions based on decrypted portions of the summary data.

Referring to FIG. 9, payer indirect clearing system 122 may receive an updated distributed ledger from one or more computing systems operating within environment 100, e.g., peer system 162 of FIG. 1 (e.g., in step 902). As described herein, the updated distributed ledger may record, within one or more ledger blocks, discrete elements of status data selectively encrypted using a public cryptographic key of payer indirect clearing system 122, and the selectively encrypted elements of the status data may characterize a reconciliation and settlement status of one or more payment transactions submitted by payer indirect clearing system 122 for indirect settlement by a direct participant in one or more transaction processing networks, e.g., payer direct clearing system 142 if FIG. 1.

Payer indirect clearing system 122 may also access cryptographic data maintained within one or more tangible, non-transitory memories, and extract a public key certificate and a corresponding private cryptographic key associated with, or assigned to, payer indirect clearing system 122 (e.g., in step 904). Further, payer indirect clearing system 122 may parse the ledger blocks of the updated distributed ledger to identify one of the ledger blocks that record the public key certificate of payer indirect clearing system 122 (e.g., in addition to any recorded encrypted data or data access control information) and as such, are amenable to decryption and processing by payer indirect clearing system 122 (e.g., in step 906). By way of example, and in addition to the public key certificate of payer indirect clearing system 122, the identified ledger block may also include encrypted status data and data access control information, along with a digital signature, a hash value, and public cryptographic key associated with peer system 162, which generated the identified ledger block.

In some instances, in step 908, payer indirect clearing system 122 may perform any of the exemplary processes described herein to validate an integrity of the identified ledger block and further, to validate an integrity of the encrypted status data included within the identified ledger block (e.g., in step 908). If payer indirect clearing system 122 were unable to validate the integrity of either the identified ledger block or the encrypted status data (e.g., step 908; NO), exemplary process 900 may pass back to step 902, and payer indirect clearing system 122 may await a receipt of an additional update to the distributed ledger.

Alternatively, if payer indirect clearing system 122 were to validate the integrity of the identified ledger block and the encrypted status data (e.g., step 908; YES), payer indirect clearing system 122 may perform operations that decrypt the encrypted summary data using the private cryptographic key (e.g., in step 910). In some instances, each element of the decrypted status data is associated with, and corresponds to, one of the payment transactions submitted by payer indirect clearing system 122, and cleared and settled by payer direct clearing system 142 using any of the exemplary processes described herein.

For example, and for a corresponding one of the submitted payment transactions, the decrypted status data may include, among other things: a corresponding correlation identifier; payment summary data (e.g., that includes transaction parameter values characterizing the corresponding one of the submitted payment transactions); settlement status data (e.g., that includes information characterizing a successful or unsuccessful settlement of the corresponding one of the submitted payment transactions); and reconciliation status data (e.g., that includes information characterizing a reconciliation of the corresponding one of the submitted payment transactions by payer indirect clearing system 122). Further, the decrypted status data may include additional data elements that characterize each of the additional payment transactions submitted by payer indirect clearing system 122, and cleared and settled by payer direct clearing system 142 using any of the exemplary processes described herein.

In some instances, payer indirect clearing system 122 may perform any of the exemplary processes described herein to reconcile each of the submitted transactions based on corresponding portions of the decrypted status data (e.g., the payment summary data, the settlement status data, and the reconciliation status data for each of the submitted payment transactions) and elements of correlated transaction data locally maintained by payer indirect clearing system 122 (e.g., in step 912). By way of example, and for a particular one of the submitted payment transactions, payer indirect clearing system 122 may access a corresponding portion of the settlement status data within the decrypted status data and confirm that payer direct clearing system 142 successfully cleared and settled the particular payment transaction in accordance with consistent with payment summary data. Further, and based on a corresponding portion of the payment summary data, payer indirect clearing system 122 may determine that the one or more transaction processing networks successfully transferred the funds consistent with the transaction amount to the specified destination account.

Payer indirect clearing system 122 may also perform operations in step 914 that generate an element of reconciliation data indicative of the successful and completed settlement of the particular payment transaction, and store the generated element of reconciliation data within one or more tangible, non-transitory memories. Payer indirect clearing system 122 may perform any of these exemplary processes in step 912 to reconcile each additional or alternate one of the submitted payment transactions, as specified within the correlated transaction data.

Referring back to FIG. 9, payer indirect clearing system 122 may perform additional operations that update account data associated with payer 103, e.g., as identified within the payment summary data of decrypted status data, to reflect a credit or a debit associated with each of the now-settled payment transactions (e.g., in step 914). Exemplary process 900 is then complete in step 916.

Exemplary embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Further, exemplary embodiments of the subject matter described in this specification, including, but not limited to, payment application 202, APIs 212, 268, 302, 336, and 606, transaction engine 214, validation module 216, indirect settlement module 220, status module 234, block generation module 244, block generation module 270, distributed consensus module 282, transaction engine 304, validation module 306, management module 308, reconciliation module 312, direct settlement module 320, status module 336, block generation module 348, reconciliation module 404, reconciliation and settlement module 608, status module 620, block generation module 628, validation module 662, and reconciliation and settlement module 666, can be implemented as one or more computer programs, i.e., one or more modules of computer program instructions encoded on a tangible non-transitory program carrier for execution by, or to control the operation of, a data processing apparatus (or a computer system). Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and/or "system" refer to data processing hardware and encompasses all kinds of apparatus, devices, and machines for processing data, including by way of example a programmable processor, a computer, or multiple processors or computers. The apparatus, device, and/or system can also be or further include special purpose logic circuitry, such as an FPGA (field programmable gate array) or an ASIC (application-specific integrated circuit). The apparatus, device, and/or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed for execution on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. For example, a central processing unit will receive instructions and data from a read-only memory or a random access memory or both. The central processing may also for perform or execute instructions and may be operatively coupled one or more memory devices for storing instructions and data. Further, the computer will also include, or be operatively coupled to receive data from or transfer data to, or both, one or more mass storage devices for storing data, such as magnetic, magneto-optical disks, or optical disks. However, the computer need not have such devices. Moreover, the computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Various exemplary embodiments have been described herein with reference to the accompanying drawings. It will, however, be evident that various modifications and changes may be made thereto, and additional embodiments may be implemented, without departing from the broader scope of the disclosed embodiments as set forth in the claims that follow. It is intended, therefore, that this disclosure and the examples herein be considered as exemplary only, with a true scope and spirit of the disclosed embodiments being indicated by the following listing of exemplary claims.

Additionally, and in this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

What is claimed is:

1. An apparatus, comprising:
a communications interface;
a memory storing instructions; and
at least one processor coupled to the communications interface and the memory, the at least one processor being configured to execute the instructions to:
obtain first transaction information characterizing a data exchange, the first transaction information comprising first parameter values of the data exchange and additional content associated with the data exchange, and the first transaction information being structured in accordance with a first format;
transmit, to a first computing system via the communications interface, first request data that requests an execution of the data exchange by a second computing system, the first request data comprising the first transaction information, the first computing system being configured to generate second request data that includes at least a subset of the first parameter values of the data exchange and submit the second request data to the second computing system through a programmatic interface associated with the second computing system, the second request data being structured in accordance with a second format associated with the second computing system, the second computing system being configured to execute the data exchange in accordance with at least the subset of the first parameter values, and the programmatic interface being inaccessible to the apparatus via the communications interface;
load at least one element of a distributed ledger from the memory, the at least one element comprising encrypted second transaction information that characterizes the execution of the data exchange by the second computing system; and
decrypt the encrypted second transaction information and perform operations that reconcile the executed data exchange based on the first transaction information and at least a portion of the decrypted second transaction information.

2. The apparatus of claim 1, wherein:
the first format corresponds to a standardized data-interchange format;
the second format corresponds to a legacy data interchange format associated with a legacy processing network;
the second computing system is associated with the legacy processing network; and
the first computing system is further configured to generate the second request data based on an application of mapping data to a portion of the first transaction information, the mapping data comprising information that maps the standardized data-interchange format to the legacy data-interchange format.

3. The apparatus of claim 1, wherein the at least one processor is further configured to execute the instructions to receive, via the communications interface, the first transaction information from a device, the first transaction information being generated by an application program executed at the device, and the data exchange being initiated at the device.

4. The apparatus of claim 1, wherein the at least one processor is further configured to execute the instructions to:
generate status data characterizing the data exchange;
encrypt a portion of the first transaction information using a public cryptographic key associated with the first computing system; and
transmit, via the communications interface, a recordation request that includes the status data and the encrypted portion of the first transaction information to a peer computing system, the recordation request causing the peer computing system to perform operations that record the status data and the encrypted portion of the first transaction information within an additional element of the distributed ledger, the distributed ledger being accessible at the first computing system.

5. The apparatus of claim 1, wherein:
the decrypted second transaction information comprises second parameter values that characterizes the executed data exchange; and
the at least one processor is further configured to execute the instructions to reconcile the first parameter values against corresponding ones of the second parameter values.

6. The apparatus of claim 5, wherein the decrypted second transaction information further comprises status data indicative of a status of the executed data exchange and reconciliation data indicative of a prior reconciliation of the executed data exchange by the first computing system.

7. The apparatus of claim 1, wherein the at least one processor is further configured to execute the instructions to:
load, from the memory, cryptographic data that includes a private cryptographic key associated with the apparatus; and
decrypt the encrypted second transaction information using the private cryptographic key.

8. The apparatus of claim 7, wherein the first computing system is further configured to:
generate the second transaction information, the second transaction information being indicative of the executed data exchange and comprising second parameter values that characterize the executed data exchange;
encrypt the second transaction information using a public cryptographic key of the apparatus; and
transmit the encrypted second transaction information to a peer computing system, the peer computing system being configured to perform operations that record the encrypted second transaction information within the element of the distributed ledger.

9. The apparatus of claim 1, wherein the distributed ledger comprises a permissioned distributed ledger, the permissioned distributed ledger being accessible to the apparatus and the first computing system.

10. The apparatus of claim 1, wherein:
the additional content associated comprises an electronic copy of a document associated with the data exchange; and
the first computing system is further configured to:
apply mapping data to the first parameter values of the data exchange and to the additional content, the mapping data comprising information that maps the first format to the second format;
based on the application of the mapping data to the additional content, determine that the second computing system is incapable of processing the electronic copy of the document; and
generate the second request data based on the application of the mapping data to the first parameter values of the data exchange.

11. The apparatus of claim 1, wherein the apparatus, the first computing system, and the second computing system are interconnected across a communications network, and the programmatic interface of the second computing system is inaccessible to the apparatus across the communications network.

12. A computer-implemented method, comprising:
obtaining, by at least one processor, first transaction information characterizing a data exchange, the first transaction information comprising first parameter values of the data exchange and additional content associated with the data exchange, and the first transaction information being structured in accordance with a first format;
transmitting, to a first computing system, and by the at least one processor, first request data that requests an execution of the data exchange by a second computing system, the first request data comprising the first transaction information, the first computing system being configured to generate second request data that includes at least a subset of the first parameter values of the data exchange and submit the second request data to the second computing system through a programmatic interface associated with the second computing system, the second request data being structured in accordance with a second format associated with the second computing system, the second computing system being configured to execute the data exchange in accordance with at least the subset of the first parameter values, and the programmatic interface being inaccessible to the at least one processor across a communications network;
obtaining, by the at least one processor, at least one element of a distributed ledger, the at least one element comprising encrypted second transaction information that characterizes the execution of the data exchange by the second computing system; and
by the at least one processor, decrypting the encrypted second transaction information and performing operations that reconcile the executed data exchange based on the first transaction information and at least a portion of the decrypted second transaction information.

13. The computer-implemented method of claim 12, wherein the obtaining the first transaction information comprises, by the at least one processor, receiving the first transaction information from a device, the first transaction information being generated by an application program executed at the device, and the data exchange being initiated at the device.

14. The computer-implemented method of claim 13, wherein:
the decrypted second transaction information comprises second parameter values that characterize the executed data exchange; and
the computer-implemented method further comprises reconciling, by the at least one processor, the first parameter values against corresponding ones of the second parameter values.

15. The computer-implemented method of claim 14, wherein the decrypted second transaction information further comprises status data indicative of a status of the executed data exchange and reconciliation data indicative of a prior reconciliation of the data exchange by the first computing system.

16. The computer-implemented method of claim 12, further comprising:
generating, by the at least one processor, status data characterizing the data exchange;
encrypting, by the at least one processor, a portion of the first transaction information using a public cryptographic key associated with the first computing system; and
transmitting, by the at least one processor, a recordation request that includes the status data and the encrypted portion of the first transaction information to a peer computing system, the recordation request causing the peer computing system to perform operations that record the status data and the encrypted portion of the first transaction information within an additional element of the distributed ledger.

17. The computer-implemented method of claim 12, further comprising:
obtaining, by the at least one processor, cryptographic data that includes a private cryptographic key; and
decrypting, by the at least one processor, the encrypted second transaction information using the private cryptographic key.

18. An apparatus, comprising:
a communications interface;
a memory storing instructions; and
at least one processor coupled to the communications interface and the memory, the at least one processor being configured to execute the instructions to:
receive, from a first computing system via the communications interface, first request data that requests an execution of a data exchange by a second computing system, the first request data comprising first transaction information that includes first parameter values of the data exchange and additional content associated with the data exchange, the first transaction information being structured in accordance with a first format, and the data exchange being initiated by a device in communication with the first computing system;
generate second request data that includes at least a subset of the first parameter values of the data exchange, the second request data being structured in accordance with a second format associated with the second computing system;
transmit, via the communications interface, the second request data to the second computing system through a programmatic interface associated with the second computing system, the programmatic interface being inaccessible to the first computing system across a communications network, and the second computing system being configured to execute the data exchange in accordance with at least the subset of the first parameter values;
generate second transaction information that characterizes the execution of the data exchange by the second computing system;
encrypt the second transaction information using a public cryptographic key associated with a permissioned distributed ledger, the permissioned distributed ledger being accessible to the first computing system and the apparatus; and
transmit, via the communications interface, a recordation request that includes the encrypted second transaction information to a peer computing system, the recordation request causing the peer computing system to perform operations that record the encrypted second transaction information within an element of the permissioned distributed ledger.

19. The apparatus of claim 18, wherein the first computing system is configured to:
obtain the element of the permissioned distributed ledger;
decrypt the encrypted second transaction information using a private cryptographic key associated with the permissioned distributed ledger; and
perform operations that reconcile the first transaction information and the decrypted second transaction information.

20. The apparatus of claim 18, wherein:
the additional content comprises an electronic copy of a document associated with the data exchange; and
the at least one processor is further configured to execute the instructions to:
apply mapping data to the first parameter values of the data exchange and to the additional content, the mapping data comprising information that maps the first format to the second format;
based on the application of the mapping data to the additional content, determine that the second computing system is incapable of processing the electronic copy of the document; and
generate the second request data based on the application of the mapping data to the first parameter values of the data exchange.

* * * * *